(12) United States Patent
Emery et al.

(10) Patent No.: US 11,166,469 B1
(45) Date of Patent: Nov. 9, 2021

(54) SYSTEM AND METHOD FOR PREPARING AN EDIBLE MULTILAYER FOOD CARRIER

(71) Applicant: Crunch Food, Inc., San Francisco, CA (US)

(72) Inventors: DeWolf Emery, San Francisco, CA (US); Brogan Miller, San Francisco, CA (US); Christopher Tacklind, San Francisco, CA (US); Perry Anderson, Kensington, CA (US)

(73) Assignee: Crunch Food, Inc., San Francisco, CA (US)

( * ) Notice: Subject to any disclaimer, the term of this patent is extended or adjusted under 35 U.S.C. 154(b) by 0 days.

(21) Appl. No.: 17/316,404

(22) Filed: May 10, 2021

Related U.S. Application Data

(60) Provisional application No. 63/022,045, filed on May 8, 2020.

(51) Int. Cl.
| | |
|---|---|
| *A21C 9/08* | (2006.01) |
| *A21C 11/00* | (2006.01) |
| *A21C 9/00* | (2006.01) |
| *A47J 37/00* | (2006.01) |
| *A47J 37/06* | (2006.01) |
| *A21B 5/02* | (2006.01) |
| *A21D 13/14* | (2017.01) |
| *A21D 13/33* | (2017.01) |
| *A21B 3/13* | (2006.01) |

(52) U.S. Cl.
CPC .................. *A21B 5/02* (2013.01); *A21B 3/13* (2013.01); *A21D 13/14* (2017.01); *A21D 13/33* (2017.01)

(58) Field of Classification Search
CPC ........ A21D 13/33; A21D 13/14; A21C 9/088; A21C 11/006; A23L 7/178; A23L 7/126; A23P 30/30; A23P 30/32; A21B 5/02; A21B 3/13
USPC ............... 99/323.4, 332, 349, 353, 372, 439
See application file for complete search history.

(56) References Cited

U.S. PATENT DOCUMENTS

| | | | | |
|---|---|---|---|---|
| 1,575,302 | A * | 3/1926 | Winder | A21B 5/00 99/373 |
| 1,592,768 | A * | 7/1926 | House | A21B 5/02 99/355 |
| 1,880,858 | A * | 10/1932 | Davis | B31B 70/00 425/136 |
| 1,989,724 | A * | 2/1935 | Villanyi | B29C 43/42 425/398 |

(Continued)

*Primary Examiner* — Eric S Stapleton
(74) *Attorney, Agent, or Firm* — Run8 Patent Group, LLC; Peter Miller

(57) ABSTRACT

One variation of a method for preparing a foodstuff includes: loading a first batter into a first cook chamber; inserting a first core insert into the first cook chamber to form a first thin-shell cavity of a first geometry; heating the first chamber to cook the first batter into a brittle edible shell of the first geometry; loading a second batter into a second cook chamber; inserting a second core insert into the second cook chamber to form a second thin-shell cavity approximating the first geometry; heating the second chamber to cook the second batter into a soft edible shell approximating the first geometry; applying a binding promoter to the soft edible shell; nesting the soft edible shell inside of the brittle edible shell to form a multilayer edible carrier; and loading a set of fillings into the multilayer edible carrier to complete a foodstuff.

19 Claims, 10 Drawing Sheets

"staging configuration"

(56) References Cited

U.S. PATENT DOCUMENTS

| | | | | | |
|---|---|---|---|---|---|
| 2,141,859 A | * | 12/1938 | Noel | ............... | A21B 5/02 198/418.5 |
| 2,510,024 A | * | 5/1950 | Mayer | ............... | B21D 13/02 72/397 |
| 2,563,866 A | * | 8/1951 | Puls | ............... | A21B 5/02 99/354 |
| 2,601,701 A | * | 7/1952 | Sayre | ............... | B29C 37/0003 264/320 |
| 2,700,723 A | * | 1/1955 | Lynch, Jr. | ............... | A47J 36/32 219/433 |
| 2,704,041 A | * | 3/1955 | Christman | ............... | A21B 5/02 99/427 |
| 2,715,372 A | * | 8/1955 | Whitsel | ............... | A21B 5/02 99/373 |
| 2,792,772 A | * | 5/1957 | Long | ............... | A23P 30/36 99/323.4 |
| 2,823,786 A | * | 2/1958 | Grogg, Jr. | ............... | A21B 5/02 198/464.1 |
| 2,907,268 A | * | 10/1959 | Doolin | ............... | A21B 5/02 99/353 |
| 2,917,008 A | * | 12/1959 | Kipnis | ............... | A21C 11/16 99/353 |
| 3,140,649 A | * | 7/1964 | Bacque | ............... | B26D 1/153 99/471 |
| 3,155,055 A | * | 11/1964 | Arcinae | ............... | A21C 11/006 72/334 |
| 3,202,114 A | * | 8/1965 | Cameron | ............... | A21C 11/006 426/391 |
| 3,203,368 A | * | 8/1965 | Cooper | ............... | B02C 13/09 426/391 |
| 3,256,375 A | * | 6/1966 | Bolelli | ............... | B27N 5/02 264/112 |
| 3,259,120 A | * | 7/1966 | Keating | ............... | A21B 5/02 126/21 A |
| 3,265,016 A | * | 8/1966 | Cheung | ............... | A21C 15/02 99/353 |
| 3,298,302 A | * | 1/1967 | Fries | ............... | A47J 37/1219 99/354 |
| 3,299,799 A | * | 1/1967 | Heiland | ............... | A23P 30/36 99/323.4 |
| 3,385,204 A | * | 5/1968 | Vernon | ............... | A21B 5/00 99/404 |
| 3,411,461 A | * | 11/1968 | Groth | ............... | A21C 11/006 425/238 |
| 3,425,363 A | * | 2/1969 | Carbon | ............... | A21C 11/006 425/195 |
| 3,453,950 A | * | 7/1969 | Heinrich | ............... | B30B 15/064 100/323 |
| 3,565,015 A | * | 2/1971 | Jorgensen | ............... | A21C 3/00 425/166 |
| 3,582,349 A | * | 6/1971 | Rasmusson | ............... | A23G 3/02 426/293 |
| 3,596,869 A | * | 8/1971 | Humphrey | ............... | B28B 7/025 249/155 |
| 3,597,800 A | * | 8/1971 | Silverman | ............... | A41C 5/005 425/290 |
| 3,605,642 A | * | 9/1971 | Brown | ............... | A21B 5/02 99/354 |
| 3,695,171 A | * | 10/1972 | Hartley | ............... | A47J 37/1214 99/404 |
| 3,735,692 A | * | 5/1973 | Marchignoni | ............... | A21C 9/04 99/353 |
| 3,773,520 A | * | 11/1973 | Longenecker | ............... | A21D 13/42 426/502 |
| 3,789,750 A | * | 2/1974 | Beck | ............... | A23L 19/19 99/536 |
| 3,823,659 A | * | 7/1974 | Hubka | ............... | A21C 3/04 99/353 |
| 3,853,044 A | * | 12/1974 | Albright | ............... | A47J 27/0817 99/330 |
| 3,854,391 A | * | 12/1974 | Ackroyd | ............... | A23B 4/068 99/349 |
| 3,857,331 A | * | 12/1974 | Griner | ............... | A21B 5/02 99/373 |
| 3,861,286 A | * | 1/1975 | Albright | ............... | A47J 27/0817 99/327 |
| 3,949,660 A | * | 4/1976 | Kuhlman | ............... | A21B 5/00 99/352 |
| 3,963,402 A | * | 6/1976 | Berta | ............... | A21C 9/088 425/299 |
| 3,980,009 A | * | 9/1976 | Petersen | ............... | A23P 20/20 99/353 |
| 3,985,070 A | * | 10/1976 | Longenecker | ............... | A21B 1/00 99/353 |
| 4,027,139 A | * | 5/1977 | Theimer | ............... | A47J 37/0611 219/525 |
| 4,116,119 A | * | 9/1978 | Kuhlman | ............... | A21B 5/02 99/450.6 |
| 4,162,333 A | * | 7/1979 | Nelson | ............... | A21B 5/02 264/150 |
| 4,241,650 A | * | 12/1980 | John | ............... | A47J 37/06 219/525 |
| 4,328,741 A | * | 5/1982 | Yoshikazu | ............... | A23L 7/178 100/324 |
| 4,339,993 A | * | 7/1982 | Lee | ............... | A21B 5/02 425/112 |
| 4,364,308 A | * | 12/1982 | John | ............... | A47J 37/0611 99/351 |
| 4,417,867 A | * | 11/1983 | Bauer | ............... | A21C 11/006 425/394 |
| 4,426,186 A | * | 1/1984 | Lee | ............... | A21B 5/02 414/222.01 |
| 4,431,396 A | * | 2/1984 | Lee | ............... | A21B 5/02 425/112 |
| 4,489,031 A | * | 12/1984 | Ogihara | ............... | B29C 37/006 264/294 |
| RE31,833 E | * | 2/1985 | Loeffler | ............... | A47J 37/047 219/433 |
| 4,511,324 A | * | 4/1985 | Bauer | ............... | A21B 5/02 425/398 |
| 4,555,086 A | * | 11/1985 | Kiyotomo | ............... | B29C 33/442 249/67 |
| 4,667,588 A | * | 5/1987 | Hayashi | ............... | A21B 5/02 425/256 |
| 4,732,080 A | * | 3/1988 | Vita | ............... | A47J 27/18 99/330 |
| 4,784,814 A | * | 11/1988 | Diethelm | ............... | B29C 33/04 264/102 |
| 4,809,596 A | * | 3/1989 | Akutsu | ............... | A23L 3/40 99/472 |
| 4,862,790 A | * | 9/1989 | Platteschorre | ............... | A21B 1/46 99/353 |
| 5,016,528 A | * | 5/1991 | Chen | ............... | A21B 5/02 99/353 |
| 5,044,918 A | * | 9/1991 | Brussel | ............... | B29C 70/541 425/397 |
| 5,060,561 A | * | 10/1991 | Campo | ............... | A21B 5/02 99/353 |
| 5,074,778 A | * | 12/1991 | Betts, Jr. | ............... | B30B 15/022 425/394 |
| 5,193,442 A | * | 3/1993 | Moscowitz | ............... | A47J 37/1214 134/172 |
| 5,203,261 A | * | 4/1993 | Davis | ............... | B30B 9/3078 100/215 |
| 5,298,273 A | * | 3/1994 | Ito | ............... | A21B 5/026 426/138 |
| 5,376,395 A | * | 12/1994 | Pels | ............... | A21B 5/00 425/261 |
| 5,467,693 A | * | 11/1995 | Van den Berghe | ............... | A21B 5/02 99/349 |
| 5,468,315 A | * | 11/1995 | Okada | ............... | B30B 15/064 100/220 |
| 5,470,590 A | * | 11/1995 | Brubaker | ............... | A47C 7/18 249/155 |
| 5,518,748 A | * | 5/1996 | Ito | ............... | A21B 5/026 426/138 |
| 5,540,140 A | * | 7/1996 | Rubio | ............... | A21C 11/02 99/353 |

(56) References Cited

U.S. PATENT DOCUMENTS

| | | | | |
|---|---|---|---|---|
| 5,562,021 A | * | 10/1996 | Slanik | A23P 30/36 100/316 |
| 5,686,038 A | * | 11/1997 | Christensen | B29C 70/461 264/257 |
| 5,755,152 A | * | 5/1998 | Menzin | A23P 30/10 425/261 |
| 5,921,170 A | * | 7/1999 | Khatchadourian | A21C 9/083 99/349 |
| 5,960,705 A | * | 10/1999 | D'Alterio | A22C 7/0076 425/394 |
| 6,010,325 A | * | 1/2000 | Lawrence | A21C 11/006 425/364 R |
| 6,026,737 A | * | 2/2000 | D'Alterio | A21B 5/00 425/394 |
| 6,085,486 A | * | 7/2000 | Hunter | B30B 9/3007 100/17 |
| 6,089,144 A | * | 7/2000 | Garber | A21B 5/03 219/521 |
| 6,189,439 B1 | * | 2/2001 | Weinstein | A23P 30/20 285/27 |
| 6,209,380 B1 | * | 4/2001 | Papazian | B21D 37/02 72/413 |
| 6,214,399 B1 | * | 4/2001 | Garbo | A23P 30/10 425/394 |
| 6,245,370 B1 | * | 6/2001 | Pilati | G07F 17/0078 426/289 |
| 6,283,014 B1 | * | 9/2001 | Ng | A47J 27/0802 219/431 |
| 6,398,539 B1 | * | 6/2002 | Lawrence | A21C 11/006 425/364 R |
| 6,499,392 B2 | * | 12/2002 | Aichele | A23L 5/55 99/348 |
| 6,740,349 B2 | * | 5/2004 | Franklin | A22C 11/001 426/277 |
| 7,069,840 B1 | * | 7/2006 | Howard | A22C 7/0053 100/194 |
| 7,195,551 B2 | * | 3/2007 | Shefet | A22C 11/001 426/513 |
| 7,225,729 B2 | * | 6/2007 | Backus | A47J 37/041 126/273.5 |
| 7,514,655 B2 | * | 4/2009 | Fernandez | A47J 37/0611 219/386 |
| 7,770,513 B2 | * | 8/2010 | Van Poucke | A23P 30/32 99/349 |
| 7,872,213 B2 | * | 1/2011 | De Leon | A47J 37/105 219/385 |
| 7,895,940 B2 | * | 3/2011 | Huxel | A21C 15/025 99/426 |
| 7,918,157 B2 | * | 4/2011 | Van Den Berghe | A23P 30/36 99/353 |
| 8,545,699 B2 | * | 10/2013 | Schroeder | A47J 37/1223 210/341 |
| 8,845,844 B2 | * | 9/2014 | Ishikawa | H01L 21/67132 156/285 |
| 8,956,145 B2 | * | 2/2015 | Johnson | B29C 33/308 425/394 |
| 9,253,990 B1 | * | 2/2016 | Barraco | A22C 11/06 |
| 9,420,802 B1 | * | 8/2016 | Vera | A21C 15/002 |
| 10,926,448 B2 | * | 2/2021 | Ono | B29C 51/082 |
| 2001/0020757 A1 | * | 9/2001 | Fried | B29C 33/34 264/443 |
| 2002/0176921 A1 | * | 11/2002 | Torghele | A21C 11/006 426/549 |
| 2003/0029325 A1 | * | 2/2003 | Dantlgraber | B29C 45/67 99/353 |
| 2003/0034588 A1 | * | 2/2003 | Miura | B29C 43/10 264/258 |
| 2003/0155685 A1 | * | 8/2003 | Spengler | B30B 7/02 264/250 |
| 2004/0050256 A1 | * | 3/2004 | Patenotre | A47J 37/0611 99/331 |
| 2005/0005777 A1 | * | 1/2005 | Steinberg | A47J 37/0611 99/349 |
| 2005/0039737 A1 | * | 2/2005 | Haber | A47J 37/0611 126/30 |
| 2005/0092187 A1 | * | 5/2005 | Lamartino | A22C 7/003 99/353 |
| 2005/0103207 A1 | * | 5/2005 | Hansen | A22C 7/0038 99/353 |
| 2005/0153045 A1 | * | 7/2005 | Johnson | A23L 7/126 426/559 |
| 2005/0247210 A1 | * | 11/2005 | Ragan | A47J 37/0611 99/372 |
| 2007/0000393 A1 | * | 1/2007 | Lam | A47J 37/0611 99/372 |
| 2007/0006740 A1 | * | 1/2007 | Lam | A47J 37/0611 99/372 |
| 2007/0017384 A1 | * | 1/2007 | Serra | A47J 37/0611 99/372 |
| 2010/0151093 A1 | * | 6/2010 | Wilk | A21C 11/002 426/281 |
| 2011/0151083 A1 | * | 6/2011 | Soucy | A23P 30/20 426/412 |
| 2011/0250384 A1 | * | 10/2011 | Sumi | B32B 3/30 428/118 |
| 2011/0303355 A1 | * | 12/2011 | Sumi | B29C 51/267 156/245 |
| 2011/0309547 A1 | * | 12/2011 | D'Acunto | B29C 70/443 264/293 |
| 2012/0148713 A1 | * | 6/2012 | Owensby | A23L 5/10 426/233 |
| 2012/0267824 A1 | * | 10/2012 | Nothdurft | B29C 70/48 264/257 |
| 2013/0019758 A1 | * | 1/2013 | Arevalo | A21B 1/48 99/334 |
| 2013/0071534 A1 | * | 3/2013 | Newton | A23L 5/15 426/523 |
| 2014/0367889 A1 | * | 12/2014 | Halford | B29C 35/0294 264/319 |
| 2015/0305554 A1 | * | 10/2015 | Dorsten | A47J 37/0611 426/233 |
| 2015/0373997 A1 | * | 12/2015 | Reinhart | A21B 5/023 99/352 |
| 2016/0067866 A1 | * | 3/2016 | Sekar | B25J 9/0084 99/348 |
| 2016/0316767 A1 | * | 11/2016 | Haas | B65G 47/52 |
| 2016/0331176 A1 | * | 11/2016 | Frehn | H05B 6/1272 |
| 2017/0006911 A1 | * | 1/2017 | Lutchmansingh | A21C 9/063 |
| 2018/0027823 A1 | * | 2/2018 | Bauer | A21B 3/135 |
| 2018/0027824 A1 | * | 2/2018 | Roso | A21C 15/007 |
| 2018/0177203 A1 | * | 6/2018 | Sternberg | A21C 11/166 |
| 2019/0298104 A1 | * | 10/2019 | Balsamo | H05B 6/065 |

* cited by examiner

"staging configuration"

"cook configuration"

"release configuration"

US 11,166,469 B1

SYSTEM AND METHOD FOR PREPARING AN EDIBLE MULTILAYER FOOD CARRIER

CROSS-REFERENCE TO RELATED APPLICATIONS

This application claims the benefit of U.S. Provisional Patent Application No. 63/022,045, filed on 8 May 2020, which is incorporated in its entirety by this reference.

TECHNICAL FIELD

This invention relates generally to the field of culinary appliances and food processing and more specifically to a new and useful system and method for preparing an edible multilayer food carrier in the field of culinary appliances and food processing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Single-Layer System

Figure 1A:
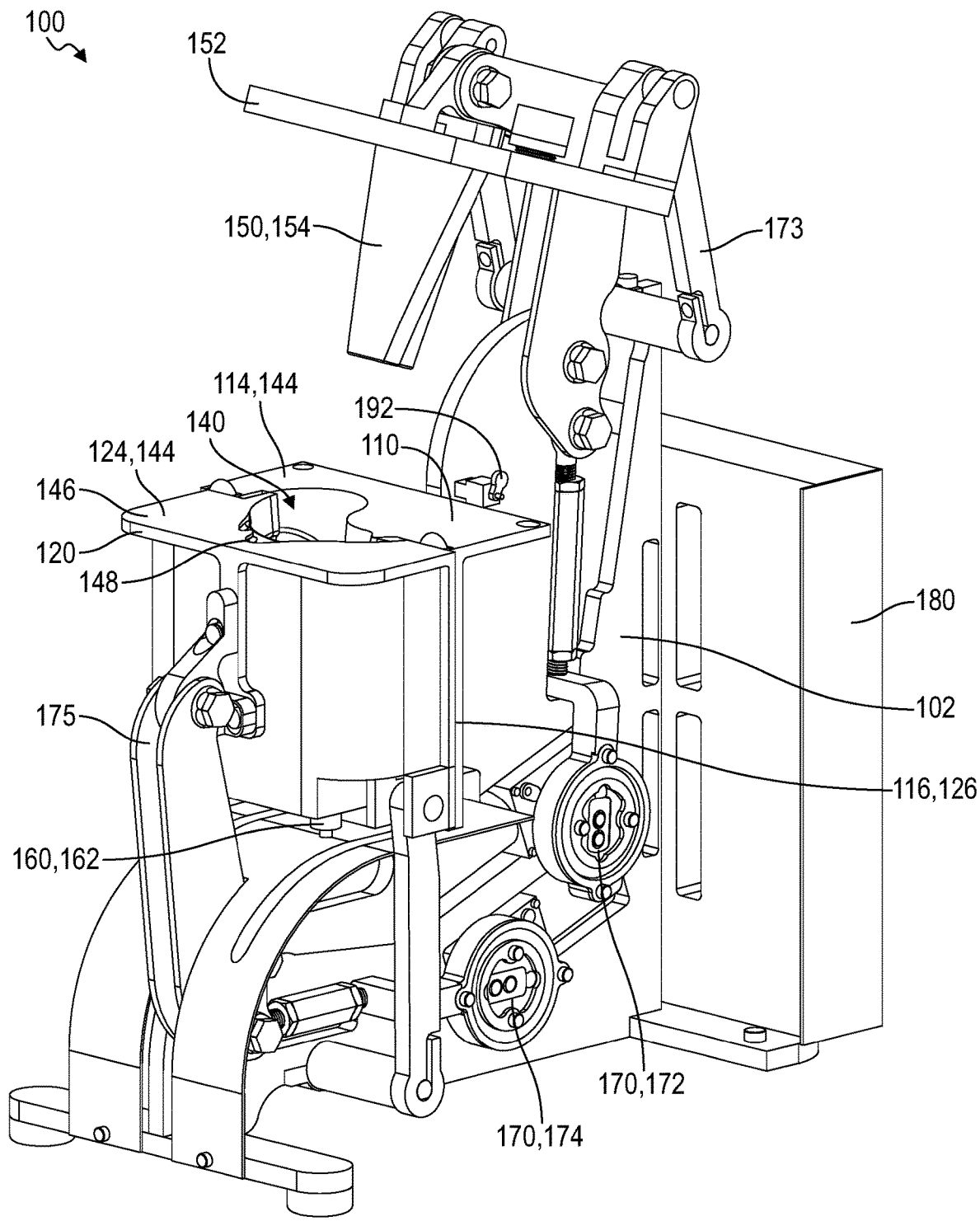
FIGS. 1A, 1B, and 1C are schematic representations of a system.
Figure 1B:
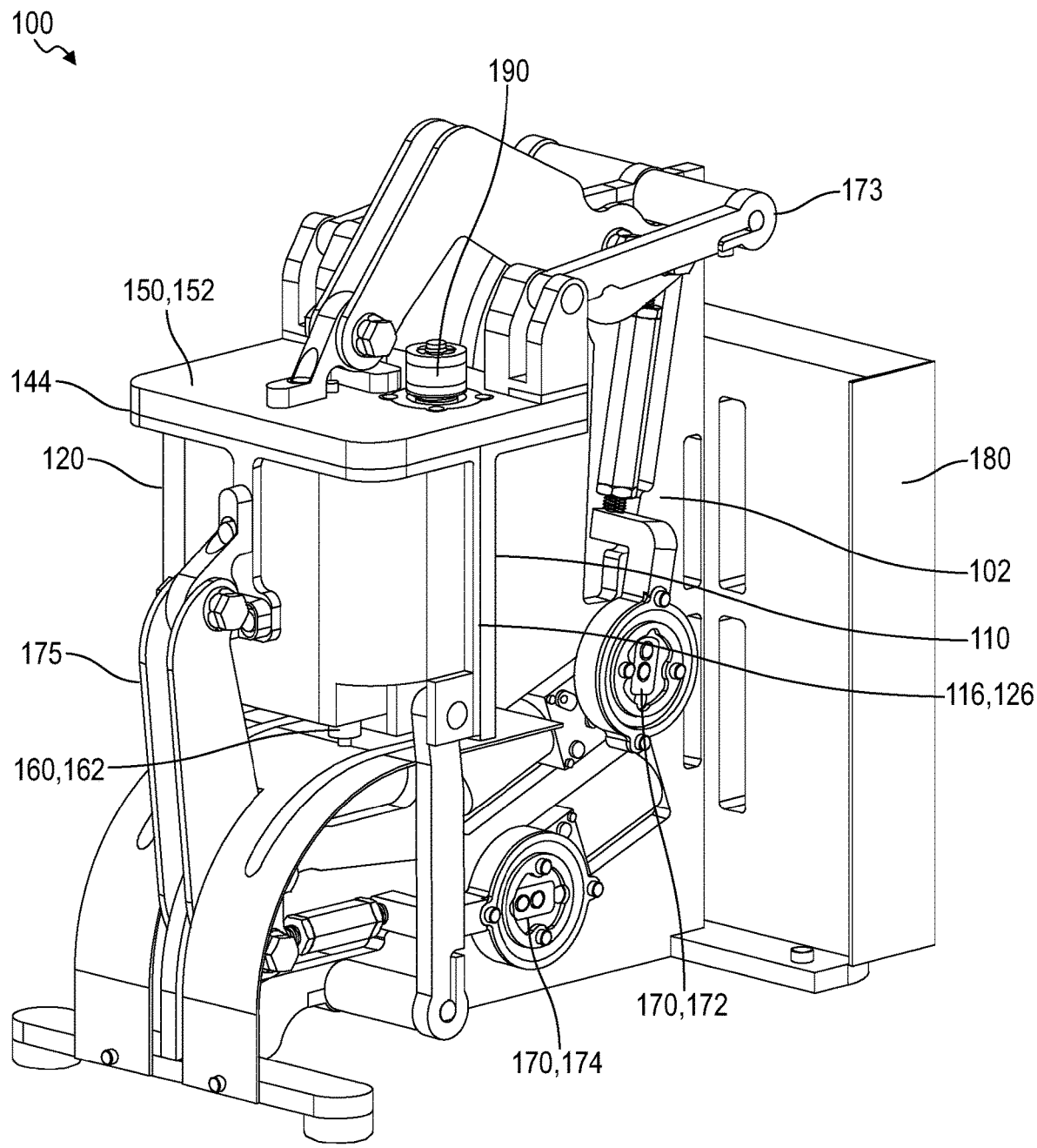
Figure 1C:
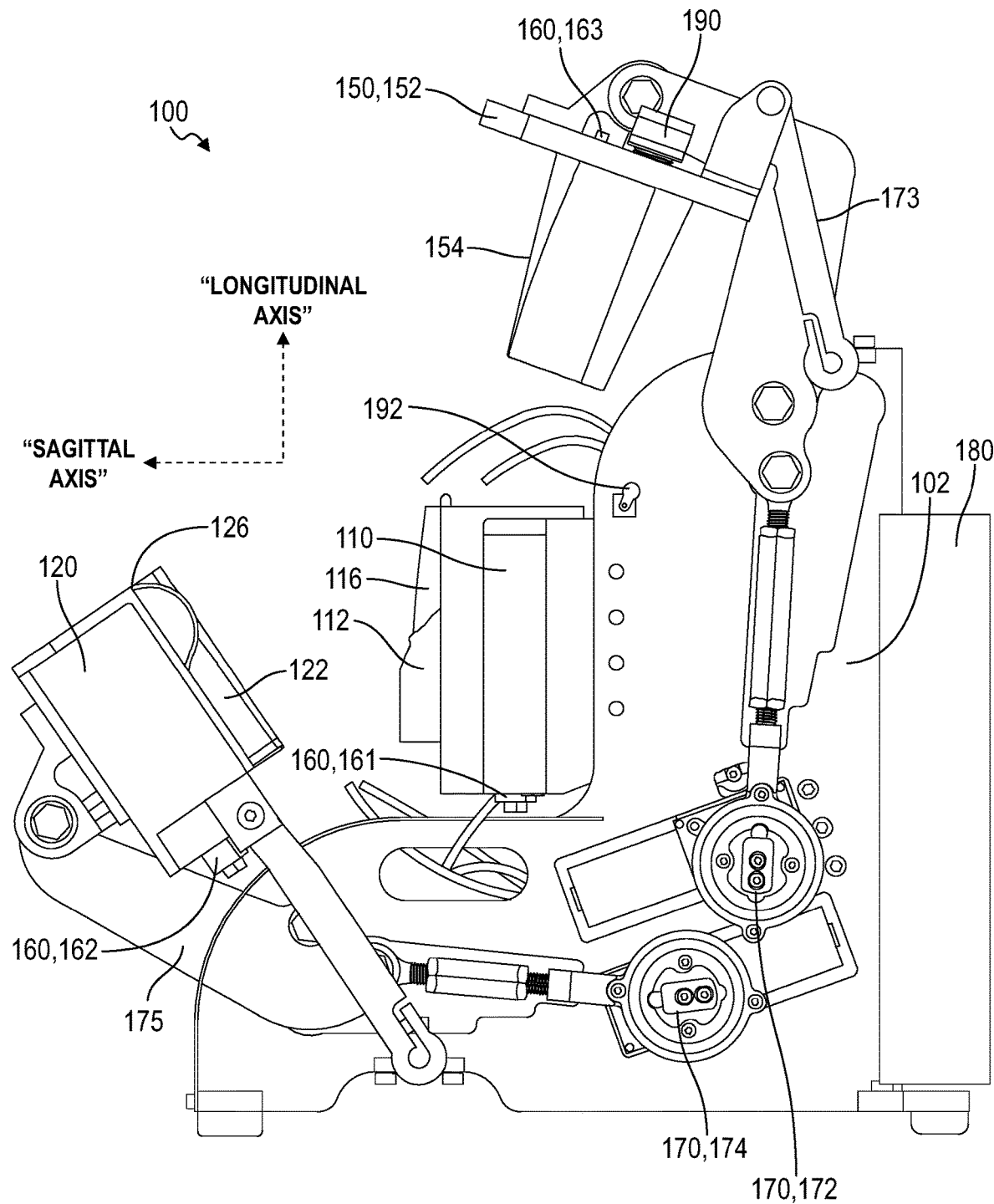

As shown in FIGS. 1A, 1B, and 1C, a system for preparing an edible food carrier includes: a first cavity element 110; a second cavity element 120; a core insert 150; a set of heating elements 160; and a set of actuators 170.

The first cavity element 110 defines a first internal cook surface 112 and a first core mating surface 114.

The second cavity element 120: is operable in a closed position and an open position; defines a second internal cook surface 122 cooperating with the first internal cook surface 112 of the first cavity element 110 to form a cook chamber 140 in the closed position; defines a second core mating surface 124 cooperating with the first core mating surface 114 of the first cavity element 110 to define a cavity interface 144 in the closed position; and is retracted from the first cavity element 110 in the open position.

The core insert 150: is operable in an inserted position and a retracted position; includes a core base 152 sealed against the cook cavity interface 144 in the inserted position; includes a cook surface projection 154 extending from the core base 152, the cook surface projection 154 located within the cook chamber 140 and inset from the first internal cook surface 112 and the second internal cook surface 122 in the inserted position to form a shell cavity 142; and is retracted from the first cavity element 110 and the second cavity element 120 in the retracted position.

The set of heating elements 160 is configured to heat the first cavity element 110 and the second cavity element 120 during a cook cycle to cook a volume of batter within the shell cavity 142 into an edible shell.

The set of actuators 170 is configured to: transition the second cavity element 120 between the closed position and the open position; transition the core insert 150 between the inserted position and the retracted position. The set of actuators 170 are further configured to locate the second cavity element 120 and the core insert 150: in the closed position and the retracted position, respectively, in a staging configuration to receive the volume of batter; in the closed position and the inserted position, respectively, in a cook configuration to cook the volume of batter into the edible shell; and in the open position and the retracted position, respectively, in a release configuration for removal of the edible shell from the system 100.

Figure 4:
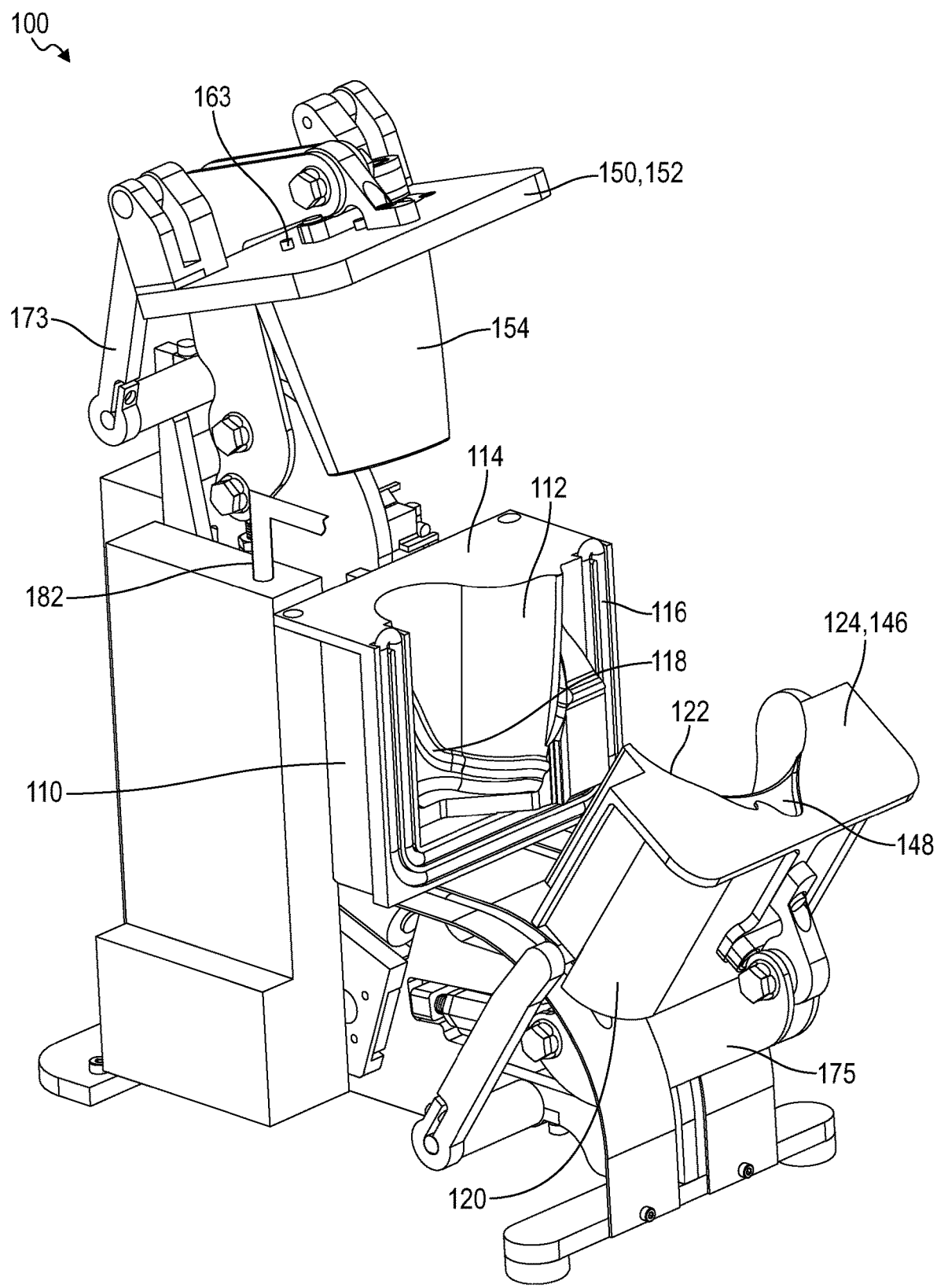
FIG. 4 is a schematic representation of one variation of the system.

As shown in FIG. 4, in one variation of the system 100, the first cavity element 110 includes: a first internal cook surface 112; a first core mating surface 14; and a first set of heating elements 161 configured to heat the first internal cook surface 112 and the first core mating surface 114.

As shown in FIG. 4, in this variation of the system 100, the second cavity element 120: includes a second internal cook surface 122 facing and substantially contiguous with the first internal cook surface 112 in the closed position (e.g., in the staging and cook configurations) and offset from the first internal cook surface 112 in the open position (e.g., the release configuration); includes a second core mating surface 124 substantially contiguous with (and parallel to) the first core mating surface 114 in the closed position and offset from the first core mating surface 114 in the open position; includes a second set of heating elements 162 configured to heat the second internal cook surface 122 and the second core mating surface 124; is configured to engage the first cavity element 110 to define a cook chamber 140 between the first internal cook surface 112 and the second internal cook surface 122 in the staging configuration; and is configured to retract from the first cavity element 110 in the open position (e.g., in the release configuration).

Figure 2:
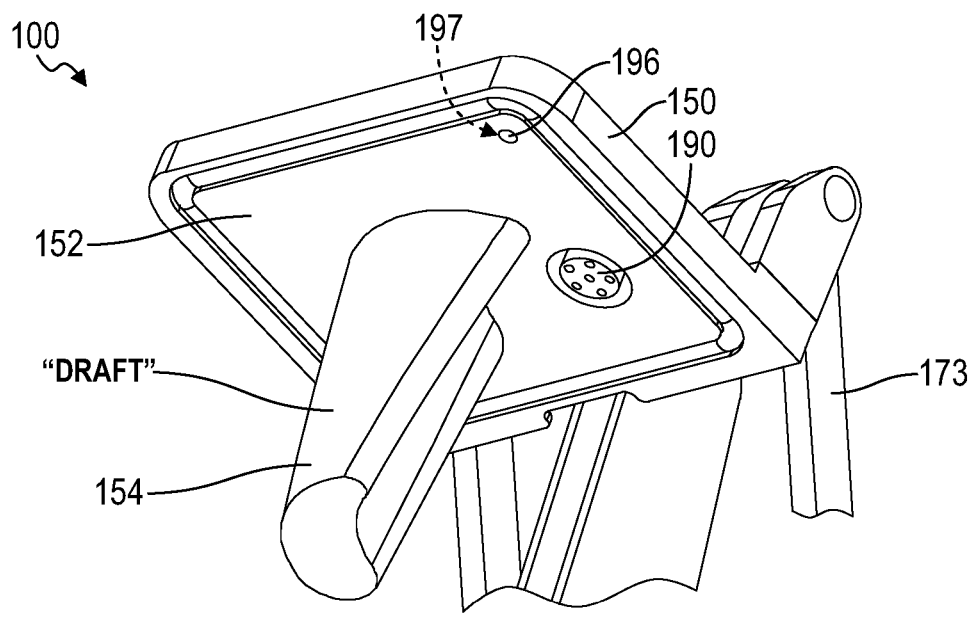
FIG. 2 is a schematic representation of one variation of the system.

As shown in FIG. 2, in this variation of the system 100, the core insert 150: includes a core base 152 facing the first core mating surface 114 and the second core mating surface 124 in the inserted position (e.g., in the cook configuration); includes a cook surface projection 154 configured to insert into and inset from the cook chamber 140 in the inserted position; includes a third set of heating elements 163 configured to heat the core base 152 and the cook surface projection 154; is configured to engage the first cavity element 110 and the second cavity element 120 to define a closed, thin-shell cavity 142 between the cook surface projection 154, the first internal cook surface 112, and the second internal cook surface 122 in the inserted position; and is configured to retract from the first cavity element 110 and the second cavity element 120 in the retracted position (e.g., the staging and release configurations).

In this variation of the system 100, the controller 180 is configured to supply and distribute power to the first set of heating elements 161, the second set of heating elements 162, and the third set of heating elements 163 to cook a volume of batter—occupying the closed, thin-shell cavity 142 in the cook configuration—into an edible shell that can be combined with another edible shell (cooked in the same or other instance of the system 100 to form a multilayer edible carrier.

2. Multi-Layer System

Figure 5:
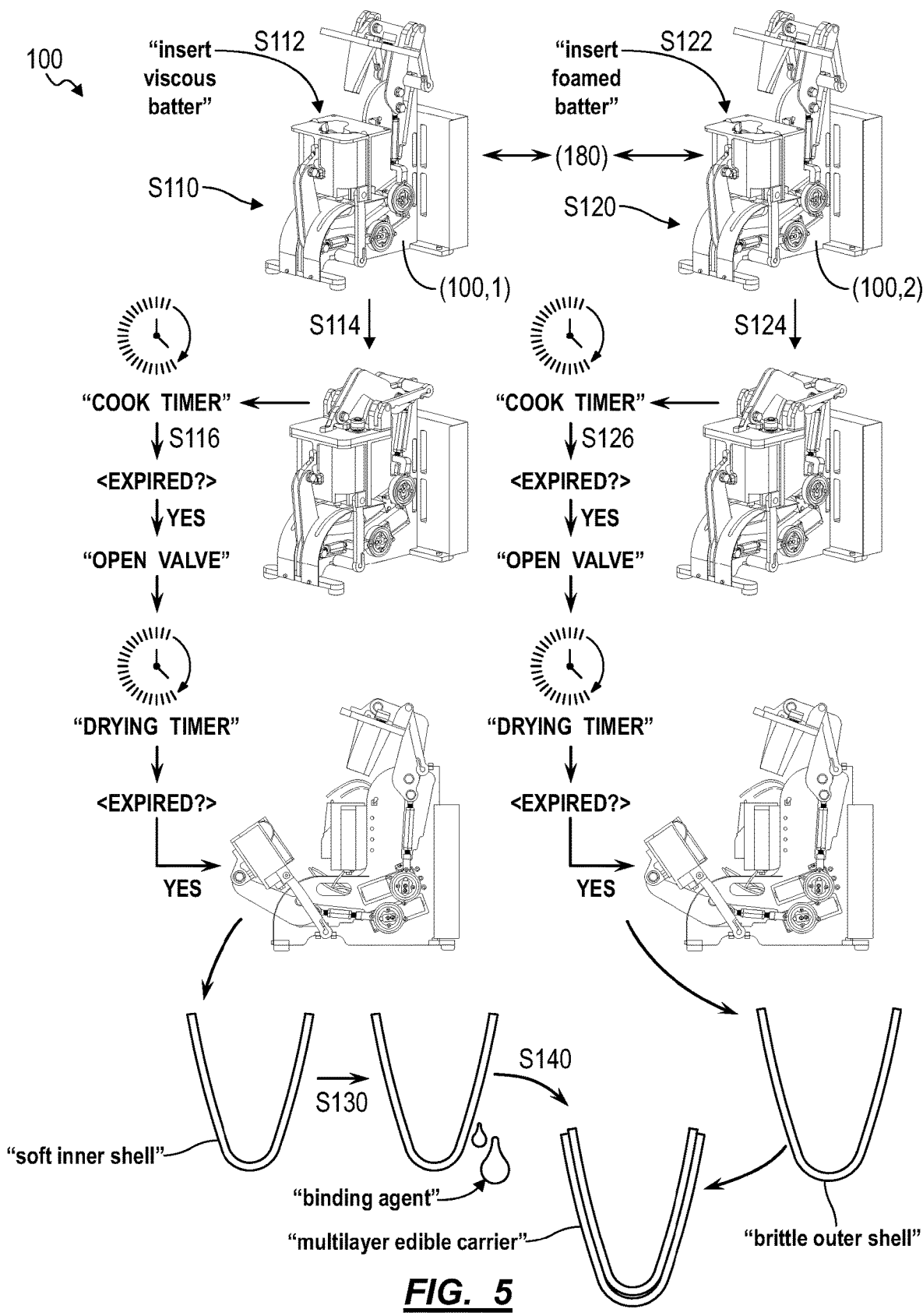
FIG. 5 is a flowchart representation of a method.

As shown in FIG. 5, one variable of the system 100 includes: a first mold assembly; a second mold assembly; and a controller 180.

The first mold assembly includes: a first rear cavity element, a first front cavity element, and a first core insert 150 assembled to form a first thin-shell cavity 142—of a first geometry—in a first cook configuration and separated in a first release configuration; a first set of heating elements 161 configured to heat the first thin-shell cook chamber 140; and a first set of actuators 170 configured to transition the first rear cavity element, the first front cavity element, and the first core insert 150 between the first cook configuration and the first release configuration.

The second mold assembly includes: a second rear cavity element, a second front cavity element, and a second core insert 150 assembled to form a second thin-shell cavity 142—approximating the first geometry—in a second cook configuration and separated in a second release configuration; a second set of heating elements 162 configured to heat the second thin-shell cook chamber 140; and a second set of actuators 170 configured to transition the second rear cavity element, the second front cavity element, and the second core insert 150 between the second cook configuration and the second release configuration.

The controller 180 is configured to: control the first set of heating elements 161 and the first set of actuators 170 to cook a first batter into a brittle edible shell of the first geometry; and control the second set of heating elements 162 and the second set of actuators 170 to cook a second batter into a soft edible shell, approximating the first geometry, for insertion into the brittle edible shell to form a multilayer edible carrier.

3. Method

As shown in FIG. 5, a method S100 for preparing a multilayer foodstuff, executed in conjunction with the system 100, includes: closing a first cavity element no pair to form a first cook chamber 140 in Block S110; loading a first volume of a first batter into the first cook chamber 140 in Block S112; inserting a first core insert 150 into the first cook chamber 140 to form a first thin-shell cavity 142 of a first geometry in Block S114; heating the first chamber to cook the first volume of the first batter into a soft edible shell of the first geometry in Block S116; closing a second cavity element 120 pair to form a second cook chamber 140 in Block S120; loading a second volume of a second batter into the second cook chamber 140 in Block S122; inserting a second core insert 150 into the second cook chamber 140 to form a second thin-shell cavity 142 approximating the first geometry in Block S124; heating the second chamber to cook the second volume of the second batter into a brittle edible shell approximating the first geometry in Block S126; applying a binding promoter to an exterior of the soft edible shell in Block S130; nesting the soft edible shell inside of the brittle edible shell to form a multilayer edible carrier in Block S140; and loading a set of fillings into the multilayer edible carrier to complete a foodstuff in Block S150.

4. Applications

The system 100 for cooking a multilayer edible food carrier includes: a set of mold components that cooperate to define a thin-shell cavity 142 in a cook configuration/closed position; and a set of heating elements 160 that heat this set of mold components to transform a volume batter—occupying this thin-shell cavity 142—into an edible thin-shell carrier. Once this edible thin-shell carrier is cooked within the thin-shell cavity 142, these mold components open to release the edible thin-shell carrier.

Furthermore, two instances of the system 100 can be operated in conjunction to concurrently: cook a first, soft (or "chewy") batter into a soft inner shell; and cook a second, brittle (or "crunchy," crispy") batter into a brittle outer shell. Once cooked, the soft inner shell can be washed, dipped, or sprayed with a binding promoter (e.g., water, oil, butter) and inserted into the brittle outer shell to form a multilayer edible food carrier that exhibits: both brittle and soft characteristics; sufficient structural integrity to hold a filling (e.g., salads, sauces, meat products, toppings) for a duration of a meal; and a thin profile containing relatively few calories, such as less than bread, fried hard and/or soft tortilla, or a fried potato crisp or similar volume carrying capacity. In particular: the brittle outer shell can provide structure to the multilayer edible food carrier, thereby enabling a user to hold and consume the multilayer edible food and its contents; the soft inner shell can support the brittle outer shell, prevent moisture migration from fillings (e.g., salads, sauces, meat products, toppings) to the brittle outer shell, extend the plate life of the brittle outer shell, and retain pieces of the brittle outer shell together as the brittle outer shell cracks during consumption. For example, the brittle outer shell can define a 4-millimeter-thick shell (or between 3.0 and 6.0 millimeters in thickness), and the soft inner shell can define a 2.5-millimeter-thick shell (or between 2.0 and 4.0 millimeters in thickness). Together, the brittle outer shell and the soft inner shell can fuse to form a 6.5-millimeter-thick shell (or between 5.0 and 10.0 millimeters in thickness) with: crispy, crunchy textural characteristics; soft, chewy internal characteristics; and structural integrity throughout consumption of the multilayer edible food and its contents.

For example, a first instance of the system 100 can include: a first set of mold components defining a first thin-shell cavity 142 geometry in the closed position; and a first controller 180 that executes a first cook cycle tuned to the first, soft-type batter to produce the soft inner shell. In this example, a second instance of the system 100 can include: a second set of mold components defining a second thin-shell cavity 142 geometry—similar to and outwardly offset from the first thin-shell cavity 142 geometry—in the cook configuration; and a second controller 180 (or the first controller 180) that executes a second cook cycle tuned to the second, brittle-type batter to produce the brittle outer shell, which can then be assembled with the soft inner shell to form the multilayer edible food carrier, as shown in FIG. 5.

Figure 6:
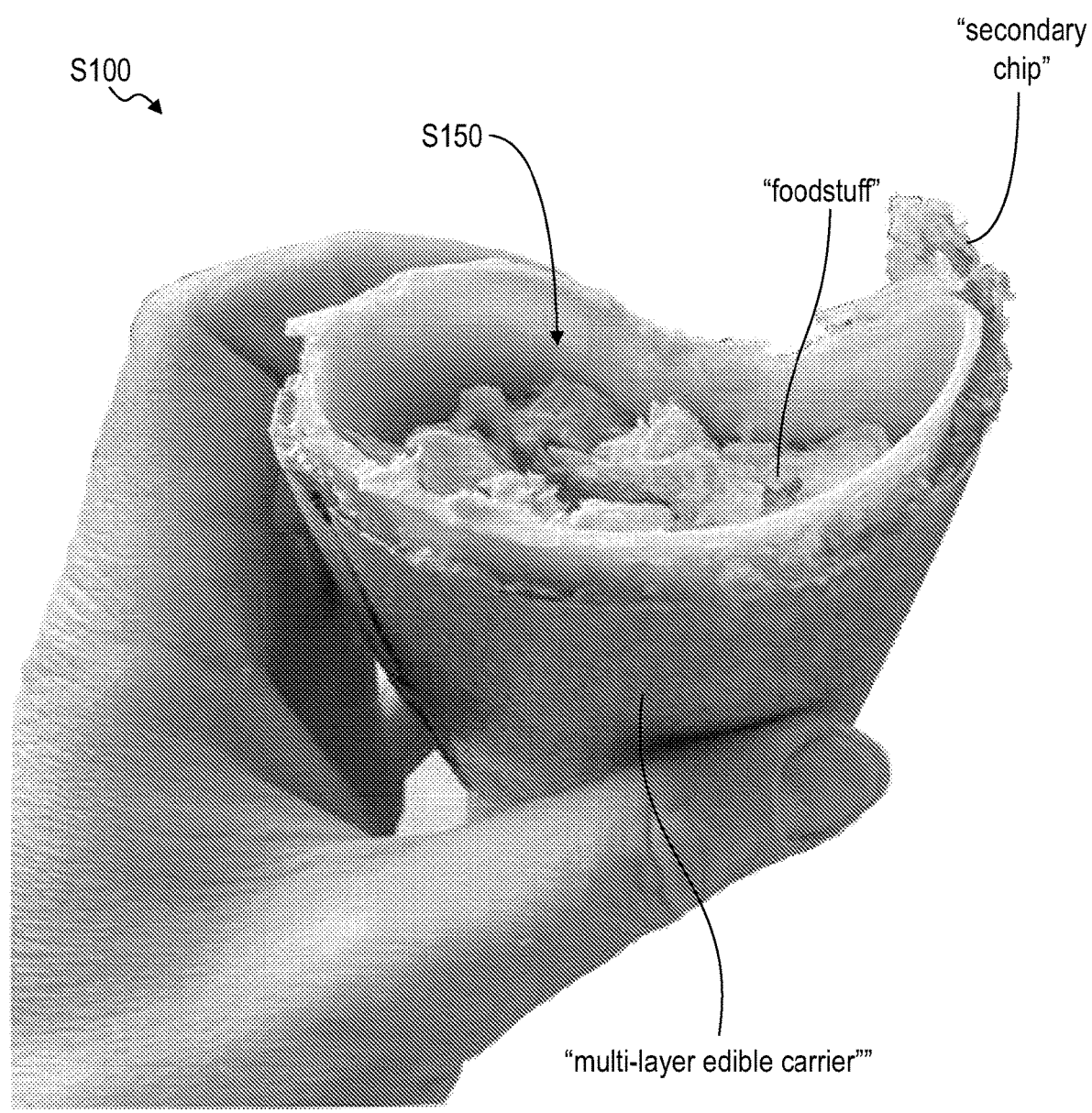
FIG. 6 is a schematic representation of an edible food carrier.

Thus, instances of the system 100 can cooperate to transform a set of (e.g., two) distinct batters into a set of (e.g., two) nested edible shells of different characteristic textures, which can then be assembled into a multilayer edible food carrier and filled with various fillings, as shown in FIG. 6.

4.1 Example

Generally, the system 100 includes a first cavity element 110, a second cavity element 120, a core insert 150, and a controller 180. The first cavity element 110, the second cavity element 120, and the core insert 150: define a set of heated cook surfaces that cooperate to form a thin-shell cavity 142 in the cook configuration; and include a set of heating elements 160 configured to heat these cook surfaces and thus cook a volume of batter to form an edible shell—in the form of the thin-shell cavity 142—during a cook cycle. The second cavity element 120 can articulate relative to the (fixed) first cavity element no to form a two-part mold (e.g., "clamshell") assembly that: closes in the staging configuration (shown in FIG. 1A) to form a cook chamber 140 with an upward-facing orifice configured to receive a volume of batter; remains closed in the cook configuration (shown in FIG. 1B) as the volume of batter is cooked in the cook chamber 140; and opens in a release configuration (shown in FIG. 1C) to enable removal of the cooked edible shell from the system 100. For example, the system 100 can include a chassis 102, and the second cavity element 120 can be supported by a cavity linkage 175 pivotably mounted to the chassis 102 below the first cavity element 110. The controller 180 can actuate a first actuator—coupled to the cook cavity linkage 175—to drive the second cavity element 120 relative to the first cavity element no and thus transition the system 100 between the closed and open positions during a cook cycle.

Similarly, the core insert 150 can be supported by a core linkage 173 (e.g., a class-3 lever mechanism) mounted to the chassis 102 above and behind the first cavity element 110. The controller 180 can actuate a second actuator—coupled to the core linkage 173—to lower the second cavity element 120 toward the first cavity element 110 and into the cook cavity, and thus transition the core insert 150 from the retracted position into the inserted position. Thus, by inserting the core insert 150 into the upward-facing orifice of the cook cavity, the system 100 can form a closed cook cavity (i.e., a thin-shell "mold cavity") within which the system 100 cooks a batter to form a thin edible shell characterized by the geometry of the closed cook cavity.

Furthermore, the system 100 can: insert the core insert 150 into the cook chamber 140 formed by the first cavity element 110 and the second cavity element 120; and drive the core base 152 of the core insert 150 against the core mating surfaces of the first and second cavity elements 110, 120 in the cook configuration. Accordingly, the system 100 can: seal the closed cook cavity to form a pressure vessel; and thus regulate temperature, pressure, and/or humidity within the closed cook cavity in order to achieve consistent, controlled textural characteristics of the edible shell.

5. Batter

As described above, multiple instances of the system 100 can receive and cook different batters to create a set of edible shells, each exhibiting a unique set of target characteristics (e.g., hardness, texture, moisture content) and which can be assembled (e.g., "nested") to form a multi-layer edible carrier exhibiting a combination of these characteristics. In one implementation, two instances of the system 100 receive and cook a soft-type batter and a brittle-type batter in order to form a soft layer and a brittle layer that can then be assembled to form a two-layer edible carrier characterized by a soft inner shell and a brittle outer shell.

5.1.1 Soft-Type Batter

In one application, a first instance of the system 100 cooks a soft-type, fluid batter including grain flour, potato starch, water, and/or a leavening agent to create a soft inner shell. In this application, with the system 100 in the staging configuration, a user may place a target volume of the soft-type batter within the cook chamber 140. Alternatively, the system 100 can include a fluid batter injection subsystem 182, as described below, configured to automatically dispense this target volume of soft-type batter into the cook chamber 140. The system 100 can then transition to the cook configuration by closing the core insert 150 into the cook chamber 140, thereby displacing the soft-type batter across the base of the cook chamber 140 and then up the walls of the cook chamber 140 to fill the thin-shell cavity 142 of the cook chamber 140. (The first and second cavity elements 110, 120 and the core insert 150 can therefore function as a compression mold.) The heating elements in the first and second cavity elements 110, 120 and/or the core insert 150 (or latent heat stored therein) can then heat and cook this soft-type batter (e.g., for a preset duration of 90 seconds) to form the soft inner shell.

The soft inner shell can thus define a geometry that approximates the thin-shell cavity 142 of the cook chamber 140 (e.g., a shell vessel of a consistent thickness of 2.5 millimeters) and can exhibit soft textural characteristics (e.g., a texture similar to mochi or undercooked brioche bread).

5.1.2 Brittle-Type Batter

In one application, a second instance of the system 100 cooks a brittle-type, foam batter—including grain flour, leavening agents, and/or canola oil mixed with a gas (e.g., nitrous oxide) to form a liquid-gas suspension stored under pressure (e.g., in a whipping siphon)—to create a brittle outer shell. In this application, with the system 100 in the staging configuration, a user may inject a target volume of the brittle-type batter into the cook chamber 140 via a whipping siphon. Alternatively, the system 100 can include a fluid batter injection subsystem 182, as described below, configured to automatically dispense this target volume of brittle-type batter into the cook chamber 140. The system 100 can then transition to the cook configuration by closing the core insert 150 into the cook chamber 140, thereby displacing the brittle-type batter across the base of the cook chamber 140 and then up the walls of the cook chamber 140 to fill the thin-shell cavity 142 of the cook chamber 140. The heating elements in the first and second cavity elements 110, 120 and/or the core insert 150 (or latent heat stored therein) can then heat and cook this brittle-type batter (e.g., for a preset duration of 2 minutes) to form the brittle outer shell.

The brittle outer shell can thus define a geometry that approximates the thin-shell cavity 142 of the cook chamber 140 (e.g., a shell vessel of a consistent thickness of 4.0 millimeters) and can exhibit crunchy, crispy textural characteristics (e.g., a glassy, brittle, fried-like or brittle-like texture that shatters when chewed).

6. Mold

Each instance of the system 100 includes: a first cavity element 110; a second cavity element 120; and a core insert 150 that cooperate to form a mold (e.g., a compression mold) in the cook configuration.

6.1 First Cavity Element

Generally, as shown in FIG. 4, the first cavity element 110 can include: a first internal cook surface 112 defining a rear clamshell surface extending along a longitudinal axis; and a first core mating surface 114 extending laterally from an upper edge of the internal cook surface. The first cavity element 110 can be fixedly mounted (or "statically coupled") to a chassis 102, and the set of heating elements 160 can include a first heating element inserted into the first cavity element 110 and configured to heat the first internal cook surface 112 and the first core mating surface 114.

The first cavity element 110 can be manufactured from a heat-conductive material, such as: cast iron; a steel alloy (stainless steel, carbon steel); an aluminum alloy; a copper alloy; or a ceramic. For example, the first cavity element 110 can define a solid-core, unitary structure.

6.1.1 Internal Cook Surface

Generally, the first internal cook surface 112 defines a rear section of the cook chamber 140 and conducts heat from the first set of heating elements 161 into a volume of batter placed in the cook chamber 140 during a cook cycle. For example, the first internal cook surface 112 can define a multifaceted, concave surface defining a rear section (e.g., a rear half) of the cook chamber 140 according to a target shape of the edible shell.

In one implementation, the first internal cook surface 112 defines a rear half of a vertically-sectioned frustoconical surface approximately a half-elliptical cross-section between two inches and four inches (e.g., 30.0") in width and between three inch and four inches in depth (e.g., 40.25") over the height of the first internal cook surface 112 (e.g., between four and six inches, or 40.25"). The first internal cook surface 112 can therefore define a positive draft configured to receive the positively-drafted core insert 150 and to enable the system 100 to withdraw the core insert 150 from the edible shell—cooked between the first internal cook surface 112 and the core insert 150—upon completion of a cook cycle.

Thus, in this implementation, the system 100 can produce a frustoconical edible shell characterized by an internal volume sufficient to carry an edible filling. For example, the system 100 can cook a volume of batter into an edible shell defining a conical section with a flat bottom such that the edible shell may remain upright when placed on a flat surface and that is sized to fit within a standard beverage- or cupholder.

Furthermore, the first internal cook surface 112 can be coated with a non-stick, food-safe coating—such as a fluoropolymer coating (e.g., polytetrafluoroethylene, perfluoroalkoxy, for soft edible shells), a ceramic coating (e.g., for soft and/or brittle edible shells), an enamel coating, or a polymerized oil coating (e.g., "seasoning," for soft and/or brittle edible shells)—in order to facilitate removal of an edible shell from the cook chamber 140 following completion of a cook cycle. Additionally or alternatively, the first internal cook surface 112 can be textured in order to further reduce separation forces between a cooked edible shell and the first internal cook surface 112 upon completion of the cook cycle.

6.1.2 Vertical Mating Surface

The first cavity element 110 can also include a flat, vertical mating surface 116: extending laterally and downward from the first internal cook surface 112; and configured to mate with and seal against a corresponding vertical mating surface 126 of the second cavity element 120 in the staging and cook configurations to form the cook chamber 140 with an upward-facing orifice configured to receive the core insert 150.

In one implementation, the vertical mating surface 116 of the first cavity element 110 includes a seal groove (e.g., a dovetail-section O-ring groove), and a seal (e.g., an O-ring) is located in this seal groove, as shown in FIG. 4. Thus, when the set of actuators 170 transitions the second cavity element 120 into the closed position, the second vertical mating surface 126 of the second cavity element 120 can mate with this seal to isolate the cook chamber 140.

6.1.3 First Core Mating Surface

The first cavity element no also includes a first core mating surface 114 arranged about the upward-facing orifice of the cook chamber 140. In particular, the first core mating surface 114 cooperates with the second core mating surface 124 of the second cavity element 120 to mate with and seal against the base of the core insert 150 in order to enclose the cook chamber 140 and form a pressure vessel compression mold in which the system 100 cooks a volume of batter into an edible shell under controlled pressure, temperature, and time conditions.

For example, the internal cook surface can extend vertically through the first cavity element no along a longitudinal axis, and the first core mating surface 114 can extend laterally—perpendicular to the longitudinal axis—from the edge of the orifice, as shown in FIG. 4.

Furthermore, the core mating surface can be coated with a non-stick, food-safe coating and can be defined by the unitary structure of the first cavity element 110, as described above.

6.2 Second Cavity Element 120

The second cavity element 120: is operable in a closed position and an open position; defines a second internal cook surface 122 cooperating with the first internal cook surface 112 of the first cavity element 110 to form a cook chamber 140 in the closed position; defines a second core mating surface 124 cooperating with the first core mating surface 114 of the first cavity element 110 to define a cavity interface 144 in the closed position; and is retracted from the first cavity element 110 in the open position;

Generally, as shown in FIG. 4, the second cavity element 120 defines a structure and set of surfaces (e.g., a second internal cook surface 122, a second vertical mating surface 126, a second core mating surface 124) similar to the first cavity element 110 and cooperates with the first cavity element 110 to define the cook chamber 140 in the staging and cook configurations. The second cavity element 120 can be mounted dynamically to the chassis 102—via a cavity linkage 175, as described below—such that the second cavity element 120 can engage and retract from the first cavity element 110 as the system 100 transitions between the release, staging, and cook configurations.

In particular, the second cavity element 120 can include a second internal cook surface 122 similar to the first internal cook surface 112 of the first cavity element 110 and that cooperates with the first internal cook surface 112 to form a continuous, seamless cook chamber 140 in the staging and cook configurations. For example, the first and second cavity elements 110, 120 can define mirrored internal cook surfaces 112, 122. Alternatively, the second internal cook surface 122 can define an asymmetrical section of the cook chamber 140 and therefore differs in shape from the first internal cook surface 112, as shown in FIG. 1A.

6.2.1 Second Core Mating Surface

The second cavity element 120 also includes a second core mating surface 124 similar to and continuous (e.g., coplanar) with the first core mating surface 114 in the staging and cook configurations. Thus, in the staging and cook configurations, the first and second core mating surfaces 114, 124 can define a continuous cavity interface 144 encircling the upward-facing orifice of the cook chamber 140. The core base 152 of the core insert 150 can seal against this cavity interface 144 to enclose the cook chamber 140, as described above.

6.3 Core Insert

As shown in FIG. 2, the core insert 150: is operable in an inserted position and a retracted position; comprises a core base 152 sealed against the cavity interface 144 in the inserted position; includes a cook surface projection 154 extending from the core base 152 and located within the cook chamber 140 and inset from the first internal cook surface 112 and the second internal cook surface 122 in the inserted position to form a shell cavity 142; and is retracted from the first cavity element 110 and the second cavity element 120 in the retracted position.

Generally, as shown in FIGS. 1A, 1B, and 2, the cook surface projection 154 is configured: to insert into the cook chamber 140; and to locate inset from the first and second internal cook surfaces 112, 122 by a target edible shell thickness to form a shell cavity 142. The core base 152 functions to seal against the cavity interface 144 (i.e., the first and second core mating surfaces 114, 124) and to enclose the cook chamber 140 to form a pressure vessel, thereby trapping water vapor in the batter, increasing the boiling point in the cook chamber 140, and increasing a cook rate of the batter during the cook cycle.

For example, the core insert 150 functions as a male mold core insertable into the female cook chamber—defined by the first and second cavity elements 110, 120—to form a thin-shell mold cavity corresponding to a target shape and thickness of the edible shell (e.g., a smooth frustoconical shell with a thickness between 2.0 and 6.0 millimeters).

Furthermore, the core base 152 and the cook surface projection 154 can be coated with a non-stick coating, texture, and/or material in order to facilitate release of the cook surface projection 154 from the edible shell upon completion of the cook cycle.

6.3.1 Core Ejector

In one variation, the core insert 150 includes an ejector (e.g., an ejector pin): arranged inside the cook surface projection 154 and extending parallel to the longitudinal axis of the cook surface projection 154; and configured to extend downwardly from the cook surface projection 154 to drive an edible shell—cooked against the cook surface projection 154 during a last cook cycle—off of the cook surface projection 154 (e.g., responsive to failure of the edible shell to release from the cook surface projection 154 once the system 100 transitions from the cook configuration to the release configuration).

In a similar variation, the cook surface projection 154 includes a set of gas jets coupled to a gas supply 197 and configured to inject a gas (e.g., air, steam, nitrogen) between the edible shell—cooked against the cook surface projection 154 during a last cook cycle—and the cook surface projection 154, such as: responsive to failure of the edible shell to release from the cook surface projection 154 once the system 100 transitions from the cook configuration to the release configuration; or as the system 100 retracts the core insert 150 from the cook chamber 140 upon completion of this cook cycle.

7. Heating Elements

Each instance of the system 100 also includes a set of heating elements 160 configured to heat the first cavity element 110, the second cavity element 120, and/or the core insert 150 during a cook cycle in order to cook a volume of batter into an edible shell.

Generally, the system 100 can include a first set of heating elements 161 installed in (e.g., inserted into) the first cavity element no and configured to heat the first cavity element 110—and therefore the first internal cook surface 112—to a target cook temperature during a cook cycle, as shown in FIGS. 1A and 1C. For example, the first set of heating elements 161 can include a set of cartridge heaters inserted into bores in the rear of the first cavity element no and arranged adjacent the first internal cook surface 112 and the first core mating surface 114. In another implementation, the first set of heating elements 161 includes a set of tubular heaters configured to conform to and/or potted against the rear of the first cavity element no against the first internal cook surface 112 and the first core mating surface 114 and thus configured to evenly heat the first internal cook surface 112 and the first core mating surface 114 during a cook cycle. However, the first set of heating elements 161 can include any other type of heating element (e.g., an inductive heating element) configured to heat the first internal cook surface 112 and the first core mating surface 114.

Furthermore, the system 100 can include a first temperature sensor coupled to the first cavity element 110. Accordingly, the controller 180 can therefore implement closed-loop controls to supply power to the first set of heating elements 161 to maintain the temperature of the first cavity element 110 at the target cook temperature before, during, and/or after a cook cycle based on a temperature of the first cavity element 110 read from the first temperature sensor.

Additionally or alternatively, the system 100 can similarly include: a second set of heating elements 162 coupled to the second cavity element 120 and configured to heat the second internal cook surface 122 and the second core mating surface 124; and a second temperature sensor coupled to the second cavity element 120.

Additionally or alternatively, the system 100 can similarly include: a third set of heating elements 163 coupled to the core insert 150 and configured to heat the cook surface projection 154 and the core base 152; and a third temperature sensor coupled to the core insert 150.

Thus, in the cook configuration, once batter is loaded into the cook chamber 140, the system 100 can cook the batter via the first internal cook surface 112, the second internal cook surface 122, and/or the cook surface projection 154 by implementing closed-loop controls to power the first, second, and/or third sets of heating elements based on temperatures read from the first, second, and/or third temperature sensors. More specifically, the system 100 can cook both sides of a volume of batter loaded into the cook chamber 140 by: implementing closed-loop controls to power the first and second sets of heating elements to heat the first and second cavity elements 110, 120 and therefore the first and second internal cook surfaces 112, 122 defining the outer surface of the edible shell; and implementing closed-loop controls to power the third set of heating elements 163 to heat the calibration object insert and therefore the cook surface projection 154 defining the inner surface of the edible shell.

8. Articulation and Engagement

Each instance of the system 100 includes: a chassis 102; a cavity linkage 175 that supports the second cavity element 120 on the chassis 102; a core linkage 173 that supports the core insert 150 on the chassis 102; and a set of actuators 170 (e.g., one or more electric or pneumatic motors, a manual-actuated linkage) that interface with the cavity and core linkages 175, 173 to transition the system 100 between the staging configuration (shown in FIG. 1A), the cook configuration (shown in FIG. 1B), and the release configuration (shown in FIG. 1C).

In one implementation, the core linkage 173 is actuated by a core actuator 172 and is configured to transition the core insert 150 from the inserted position into the retracted position by sweeping the core insert 150 along: a first path segment—proximal the cook chamber 140—approximating a first linear path along (e.g., parallel, coincident) the longitudinal axis; and then a second path segment—remote from the cook chamber 140—approximating an arc that locates the core insert 150 behind the first cavity element no to expose the upward-facing orifice of the cook chamber 140. In particular, by retracting the core insert 150 along the first path segment, the core linkage 173 can lift the cook surface projection 154 out of the cook chamber 140 without crushing the thin wall of the edible shell. By then retracting the core insert 150 along the second path segment, the core linkage 173 can move the core insert 150 out of the way of the cook chamber 140 to enable an operator to retrieve the edible shell from the cook chamber 140.

In this implementation, the cavity linkage 175 is similarly actuated by a cavity actuator 174 and is configured to transition the second cavity element 120 from the closed position into the open position by sweeping the second cavity element 120 along: a third path segment—proximal the first cavity element 110—approximating a second linear path perpendicular to the longitudinal axis (or normal to the first and second vertical mating surfaces 116, 126); and then a fourth path segment—remote from the first cavity element 110—approximating an arc that locates the second cavity element 120 below the first cavity element 110 to expose the first internal cook surface 112. In particular, by retracting the second cavity element 120 along the third path segment, the cavity linkage 175 can separate the second cavity element 120 from the first cavity element 110 along a direction that preserves draft of the second internal cook surface 122 along the sagittal axis of the second cavity element 120, thereby preventing damage to the thin wall of the edible shell when the cook chamber 140 is opened. By then retracting the second cavity element 120 along the fourth path segment, the cavity linkage 175 can move the second cavity element 120 out of the way of the first internal cook surface 112 in order to enable an operator to retrieve the edible shell from the first cavity element 110. Similarly, by pitching the second cavity element 120 downward to expose the second internal cook surface 122 to the operator, the cavity linkage 175 can enable the operator to retrieve the edible shell from the second cavity element 120 if the edible shell adheres to the second cavity element 120 during the cook cycle.

For example, the core linkage 173 can include: a lever, a lead screw, a five-bar a four- or five-bar linkage, and/or a sliding linkage, etc. to position the core insert 150 relative to the cook chamber 140; and/or a latch, an over-cam mechanism, etc. to secure the core base 152 of the core insert 150 against the cavity interface 144 and to seal the cook surface projection 154 inside of the cook chamber 140. Similarly, the cavity linkage 175 can include: a Class-2 lever, a four-bar linkage, and/or a sliding linkage, etc. to position the second cavity element 120 relative to the first cavity element 110; and/or a latch, an over-cam mechanism, etc. to secure the second cavity element 120 against the first cavity element no to form the cook chamber 140 in the staging and cook configurations.

However, the system 100 can be configured to articulate the second cavity element 120 relative to the first cavity element no and to locate the core insert 150 in the cook chamber 140 in any other way between the staging, cook, and release configurations.

9. Horizontal Chip

In one variation shown in FIG. 4, in the closed position, the second core mating surface 124 of the second core insert 150 cooperates with the first core mating surface 114 to define the cavity interface 144 that includes a rim 146 encircling a secondary cook chamber 148 contiguous with the cook chamber 140 and extending laterally outward from the upward-facing orifice of the cook chamber 140. For example, in the closed position, the second internal cook surface 122 of the second cavity element 120 can cooperate with the first internal cook surface 112 of the first cavity element 110 to form the cook chamber 140 that defines a longitudinal axis; and the secondary cook chamber 148 can extend outwardly from a top of the cook chamber 140 perpendicular to the longitudinal axis.

In this variation, in the inserted position, the core base 152 of the core insert 150 seals against the rim 146 and encloses the secondary cook chamber 148. During transition into the inserted position, the cook surface projection 154 of the core insert 150 displaces a volume of batter—loaded into the bottom of the cook chamber 140—up the shell cavity 142, through the orifice, and across the secondary cook chamber 148. The perimeter of the core base 152 (e.g., a silicone seal arranged proximal the perimeter of the core base 152) can then mate with and seal against the rim 146, thereby encircling a secondary cook chamber 148 to form a sealed shell cavity 142 including both the cook chamber 140 and the secondary cook chamber 148. The set of heating elements 160 thus heat the first cavity element no and the second cavity element 120 during the cook cycle to cook the volume of batter into the edible shell that includes: a thin-wall vessel defining an external vessel geometry according to the cook chamber 14o; and an edible "chip" extending laterally from a top of the thin-wall vessel and defining a chip geometry according to the secondary cook chamber 148.

Therefore, in this variation, the secondary cook chamber 148 can define an interstitial volume above and contiguous with the cook chamber 140. When, the system 100 cooks a volume of batter (e.g., the brittle-type batter and/or the soft-type batter) in the cook chamber 140, this batter can expand into the interstitial volume, thereby forming a "chip-shaped" lateral protrusion (or "chip") around the orifice of the edible shell. Later, a user may break this chip off of the edible carrier and then dip this chip into fillings in the multi-layer edible carrier before consuming the chip. The chip may therefore function both: to absorb excess batter loaded into the cook chamber 140 during a cook cycle; and as a pre-meal appetizer or dipping vehicle consumable by a user during a meal.

10. Vertical Chip

In a similar variation, the first and second cavity elements 110, 120—of an instance of the system 100 configured to cook brittle outer shells—can cooperate to form the cook chamber 140 that includes a tertiary cavity: extending laterally along a parting line between the first and second cavity elements 110, 120; and extending vertically along the height of the cook chamber. The cook surface projection 154 of the core insert 150 of this instance of the system 100 can be withheld from this tertiary cavity. Thus, when a volume of foamed batter is cooked in the cook chamber 140 of this instance of the system 100, the system 100 can form a brittle outer shell that includes a second chip running vertically along a side of the brittle outer shell. A user may thus also break this second chip off of the edible carrier and then dip (or "scoop") this chip into fillings in the multi-layer edible carrier before consuming the second chip. The second chip may therefore function: as a rib that strengths the side first the brittle outer shell; to hide a parting line along the brittle outer shell; and as a pre-meal appetizer or dipping vehicle consumable by a user during a meal.

11. Retention Undercut

In one variation shown in FIG. 4, the first internal cook surface 112 of the first cavity element 110 defines a positive draft geometry; and an undercut feature 118 configured to retain the edible shell within the first cavity element 110 during retraction of the cook surface projection 154 out of the cook chamber 140 following completion of the cook cycle. More specifically, the first internal cook surface 112 can generally define a surface with positive draft but can include a small region characterized by negative draft that functions to lock the edible shell within the cook chamber 140 and to prevent the edible shell from lifting out of the cook chamber 140 as the core insert 150 is retracted out of the cook chamber 140 upon conclusion of a cook cycle.

Furthermore, in this variation, the cook surface projection 154 can omit a like feature such that the cook surface projection 154 maintains positive draft over its entire height in order to enable the cook surface projection 154 to retract out of the edible shell without damaging the edible shell upon conclusion of the cook cycle. (Accordingly the cook chamber 140 can exhibit greater thickness proximal the undercut in the first cavity element 110.)

In one implementation, the undercut extends laterally into the first cavity element 110 perpendicular to the retraction path of the core insert 150 such that the undercut inhibits motion of the edible shell along the retraction path—and thus with the core insert 150—when the core insert 150 is retracted from the cook chamber 140 upon conclusion of the cook cycle. However, the undercut can exhibit positive draft along its full height and depth along a sagittal axis parallel to a retraction path of the second cavity element 120 such that the undercut permits (i.e., does not impede) motion of the edible shell along this sagittal axis when the cook chamber 140 is opened and/or when an operator pulls the edible shell off of the first cavity element 110 upon conclusion of the cook cycle.

For example, the first cavity element 110 can include one or more dimples extending into the first internal cook surface 112 perpendicular to the longitudinal axis of the first cavity element 110 and parallel to the sagittal axis of the first cavity element 110. Additionally or alternatively, in this example, the second cavity element 120 can include one or more dimples extending into the second internal cook surface 122 perpendicular to the longitudinal axis of the second cavity element 120 and parallel to the sagittal axis of the second cavity element 120.

In another example, the first and second cavity elements 110, 120 cooperate to form a set of dimples: symmetric about a parting line between the first and second cavity elements 110, 120; and extending into the first and second internal cook surfaces 112, 122 perpendicular to the longi- tudinal axis of the cook chamber 140 and parallel to the lateral axis of the cook chamber 140.

12. Batter Injection

In one variation shown in FIG. 4, one instance of system configured to cook a soft inner shell includes a fluid batter injection subsystem 182: coupled to the first cavity element 110; and configured to dispense a volume of fluid batter (i.e., the soft-type batter) into the cook chamber 140. In one implementation, the fluid batter injection subsystem 182 includes: a vessel mount arranged on the chassis 102; a storage vessel configured to (transiently) locate in the vessel mount; an extruder arranged over the cook chamber 140 (e.g., between first cavity element 110 and the core inert) and coupled to the storage vessel via a conduit; and an extruder cutter coupled to an outlet of the extruder, configured to excise a target volume soft-type batter exiting the extruder, and configured to dispense this "puck" of soft-type batter into the cook chamber 140. In this implementation, the storage vessel can include an auger (or other actuator, pressurized air supply, etc.) configured to drive the soft-type batter toward the extruder. For example, an operator may manually actuate the auger (or other actuator, pressurized air supply, etc.) and the extruder cutter to release the target volume of soft-type batter into the cook chamber 140. Alternatively, the controller 180 can automatically actuate the auger (or other actuator, pressurized air supply, etc.) and the extruder cutter to automatically dispense the target volume of the soft-type batter into the cook chamber 140 at the start of a cook cycle, such as in response to a manual input from the operator.

Alternatively, water can be added to the soft-type batter to reduce it viscosity, and the fluid batter injection subsystem 182 can include: a fluid reservoir containing the soft-type batter; a nozzle arranged over the cook chamber 140; and a pump configured to pump the soft-type batter from the reservoir into the cook chamber 140 via the nozzle. In this implementation, the cook time of the soft-type batter may be proportional to its initial water content. Therefore, water can be added to the soft-type batter up to an amount that approximately matched the cook time of a soft inner shell to the cook time of a brittle outer shell.

(Yet alternatively, an operator may manually sdrop a frozen "puck" of the soft-type batter into the cook chamber 140 in preparation for a cook cycle.)

In a similar variation, a second instance of the system 100 configured to cook brittle outer shells includes a foamed batter injection subsystem 182: coupled to the first cavity element 110; and configured to dispense a volume of foamed batter (i.e., the brittle-type batter) into the cook chamber 140. In one implementation, the foamed batter injection subsystem 182 includes: a siphon mount arranged on the chassis 102; a whipping siphon configured to (transiently) locate in the siphon mount; and a conduit extending from an outlet of the whipping siphon to a dispense position over the cook chamber 140 and between the first cavity element no and the core insert 150. In this implementation, the foamed batter injection subsystem 182 can also include a metering valve arranged between the whipping siphon and an outlet of the conduit and configured to meter a target volume of brittle-type batter from the whipping siphon into the cook chamber 140. For example, an operator may manually operate the metering valve to release the target volume of brittle-type batter into the cook chamber 140. Alternatively, the controller 180 can automatically trigger the metering valve to release the target volume of brittle-type batter into the cook chamber 140 at the start of a cook cycle, such as in response to a manual input from the operator.

13. Controller

Generally, the system 100 includes a controller 180 configured to execute Blocks of the method S100 during a cook cycle in order to cook an edible shell of the multilayer edible carrier. More specifically, the controller 180 can: implement closed-loop controls to maintain the temperature of cook surfaces within the shell cavity 142—defined by the first cavity element 110, the second cavity element 120, and the core insert 150 within one instance of the system 100—at a target temperature (e.g., between 300° and 400° Fahrenheit for a soft inner shell; between 300° and 450° Fahrenheit for a brittle outer shell;); and control the set of actuators 170 to automatically transition the second cavity element 120 and the core insert 150 between the staging, cook, and release configurations according to a preset cook duration or other preset cook parameters.

In one implementation, the first cavity element 110, the second cavity element 120, and the core insert 150 include solid, thermally-conductive structures that form large thermal masses. Before and during a cook cycle, the controller 180 implements proportional, integral, and/or derivative control schema to maintain the temperature of these thermal masses—and therefore the cook surfaces within the cook chamber 140—at a target fixed cook temperature, such as specified for the batter type loaded into the cook chamber 140.

In another implementation, the controller 180 can access a sequence of target temperatures (e.g., for all or individual cook surfaces within the cook chamber 140) assigned to discrete time intervals during a cook cycle for a particular batter type loaded into the cook chamber 140. The controller 180 then maintains an internal clock or timer and implements closed-loop controls to drive the cook surfaces to their designated target temperatures as a function of time throughout the cook cycle.

In one variation, the controller 180 is coupled to and implements similar methods to control both: a first instance of the system 100 configured to cook soft inner shells; and a second instance of the system 100 configured to cook brittle outer shells. Alternatively, each instance of the system 100 can include a dedicated controller 180 that executes these processes independently of other instances of the system 100 operating nearby.

13.1 Cook Cycle

In one implementation shown in FIG. 5, in preparation for a cook cycle, the controller 180 can trigger the core actuator 172 to transition the core insert 150 to the retracted position and trigger the cavity actuator 174 to transition the second cavity element 120 to the closed position in Block S110, thereby setting the system 100 in the staging configuration as shown in FIG. 1A. Upon receipt of a command from an external controller 180 (e.g., an order management service, a master cook controller 180) or from an operator (e.g., selection of a "start" button on the chassis 102), the controller 180 can trigger a batter injection subsystem 182 described above to dispense a target volume of batter into the cook chamber 140 in Block S112 and then trigger the core actuator 172 to transition the core insert 150 into the inserted position to insert the cook surface projection 154 into the cook chamber 140 and to seal the resulting shell cavity 142 in Block S114, as shown in FIG. 1B.

Alternatively, the operator may manually place the target volume of batter in the cook chamber 140 and then manually enter a start command, such as by selecting a "start" button on the chassis 102; upon receipt of this command, the controller 180 can trigger the core actuator 172 to transition the core insert 150 into the inserted position in Block S114.

Once the core insert 150 enters the inserted position, the controller 180 can initiate a cook timer for a target cook time for the batter type loaded into the cook chamber 140, such as 90 seconds for the soft-type batter or two minutes for the brittle-type batter. Throughout this cook time, the controller 180 can continue to maintain the temperature of the first cavity element 110, the second cavity element 120, and/or the core insert 150 in Block S116, as described above.

Upon expiration of the cook time, the controller 180 can trigger the core actuator 172 to transition the core insert 150 to the retracted position, thereby extracting the cook surface projection 154 from the edible shell now present in the cook chamber 140. Once the core insert 150 reaches the retracted position, the controller 180 can trigger the cavity actuator 174 to transition the second cavity element 120 to the open position, thereby opening the cook chamber 140 as shown in FIG. 1C, enabling the operator to retrieve the edible shell, and completing the cook cycle.

In this example and as shown in FIG. 5, the controller 180 (or a second controller) can implement a similar process at a second instance of the system 100 to cook a brittle outer shell in Blocks S120, S122, S124, and S126.

In particular, the first and second cavity elements 110, 120 of the second instance of the system 100 can define a second cook chamber 140 of a similar but larger geometry than the cook chamber 140 of the first instance of the system 100 configured to cook soft inner shells. For example, the second cook chamber 140 can be outwardly offset from the geometry of the (first) cook chamber 140 by a target thickness of the brittle outer shell (e.g., 4.0 millimeters). Similarly, the core insert 150 of the second instance of the system 100 can define a geometry similar to (or slightly larger than) the geometry of the (first) cook chamber 140 such that the soft inner shell may easily insert into and nest within the brittle outer shelf.

14. Pressure Control

In one variation, the system 100 controls pressure within the cook chamber 140 throughout a cook chamber via active and/or passive valves fluidly coupled to the cook chamber 140.

In particular the system 100 can: seal the cook chamber 140 during a first segment of the cook cycle in order to achieve increased cook pressures (e.g., up to 25 psi, 35 psi) and therefore elevate cook temperatures within the cook chamber 140 and increase cook rate of a volume of batter; and open a valve during a second segment of the cook cycle in order to release moisture from the cook chamber 140 and thus dry the edible shell to a target moisture content (e.g., 2% for the brittle outer shell, 35% for the soft inner shell).

14.1 Passive Relief Valve

In one implementation, the core base 152 is configured to seal against the cavity interface 144 in order to hold a cavity pressure within the cook chamber 140 above ambient air pressure as water in a volume of batter—loaded into the cook chamber 140—is heated during the cook cycle. In this implementation, the system 100 can further include a relief valve 190 configured to open in order to exhaust gases (e.g., steam) from the cook chamber 140 in response to the cavity pressure exceeding a set pressure (e.g., greater than 25 psi; 13 psi greater than an ambient air pressure of ~14.7 psi) during the cook cycle. For example, the relief valve 190

Figure 3:
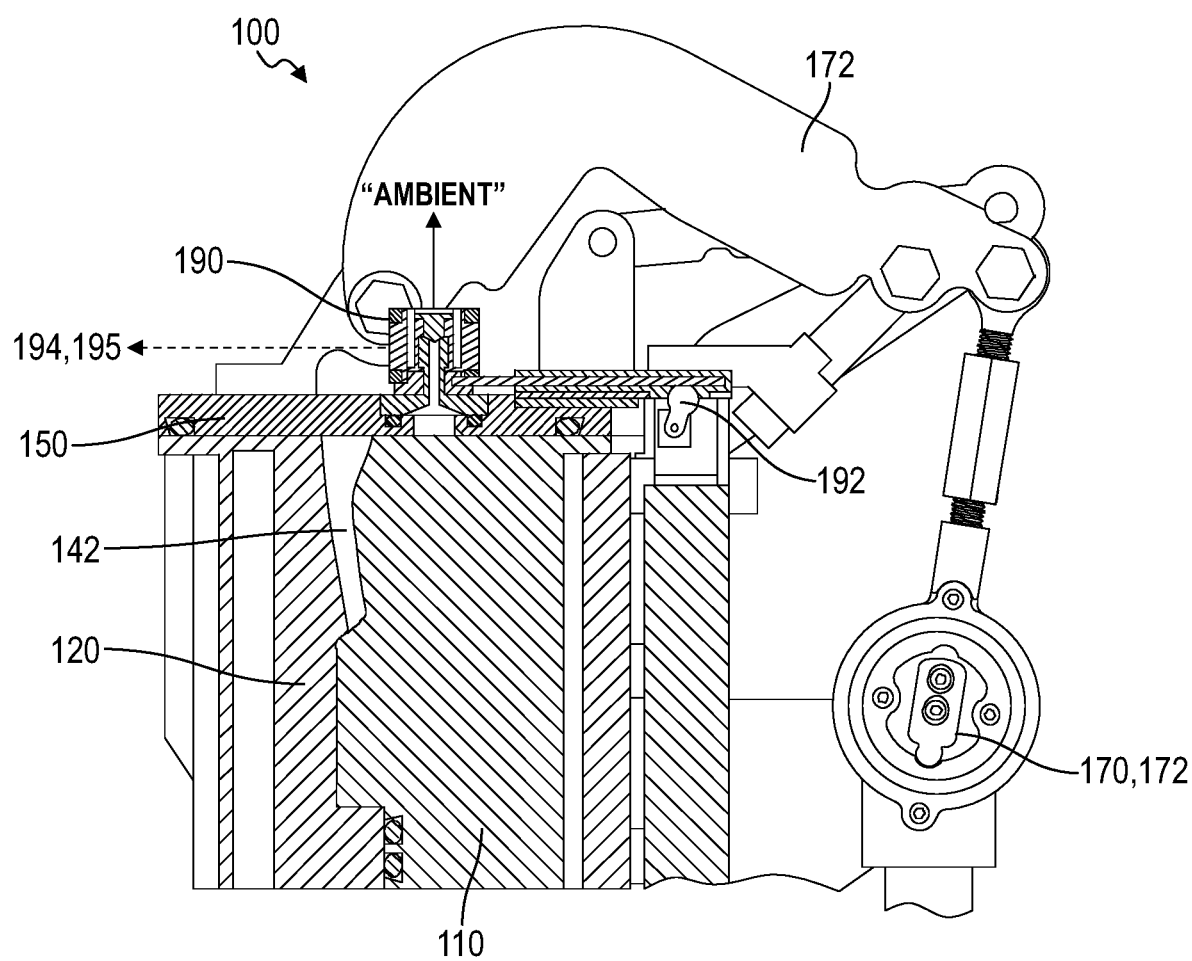
FIG. 3 is a schematic representation of one variation of the system.

(e.g., a mass regulated valve) can be arranged on the core base 152, as shown in FIGS. 2 and 3. Alternatively, the relief valve 190 can be mounted to the chassis 102 and coupled to a port in the core base 152 via a flexible hose.

Therefore, the relief valve 190 can passively function to: release steam from the cook chamber 140 if its internal pressure exceeds this set pressure; and then close once this internal pressure drops below this set pressure.

14.2 Active Relief Valve

In the foregoing implementation, the system 100 can also include a valve actuator 192 (e.g., a solenoid) coupled to and configured to open the relief valve 190. Accordingly, the controller 180 can selectively trigger the valve actuator 192 to open the relief valve 190 to release steam from the cook chamber 140 during a cook cycle, such as after a target cook time and before completion of the cook cycle in order to release moisture from the cook chamber 140 and to further drive moisture out of the edible shell—now forming in the cook chamber 140—once this volume of batter has sufficiently cooked under elevated pressures throughout the target cook time. For example, the relief valve 190 can be arranged on the core base 152, and the valve actuator 192 can be arranged on the chassis 102 and coupled to the relief valve 190 via a linkage, as shown in FIGS. 2 and 3.

Figure 8A:
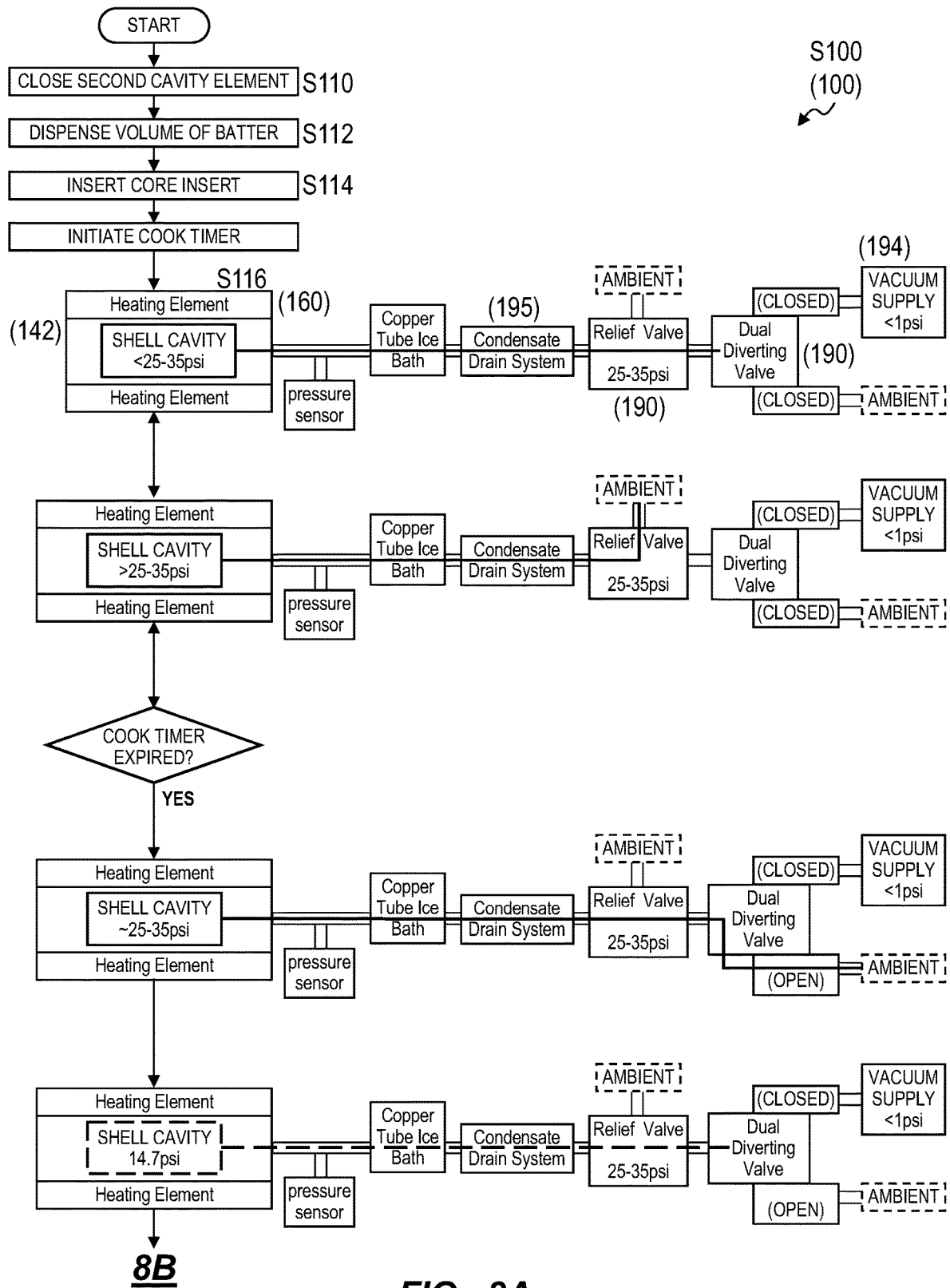
FIGS. 8A and 8B are a flowchart representation of one variation of the method.
Figure 8B:
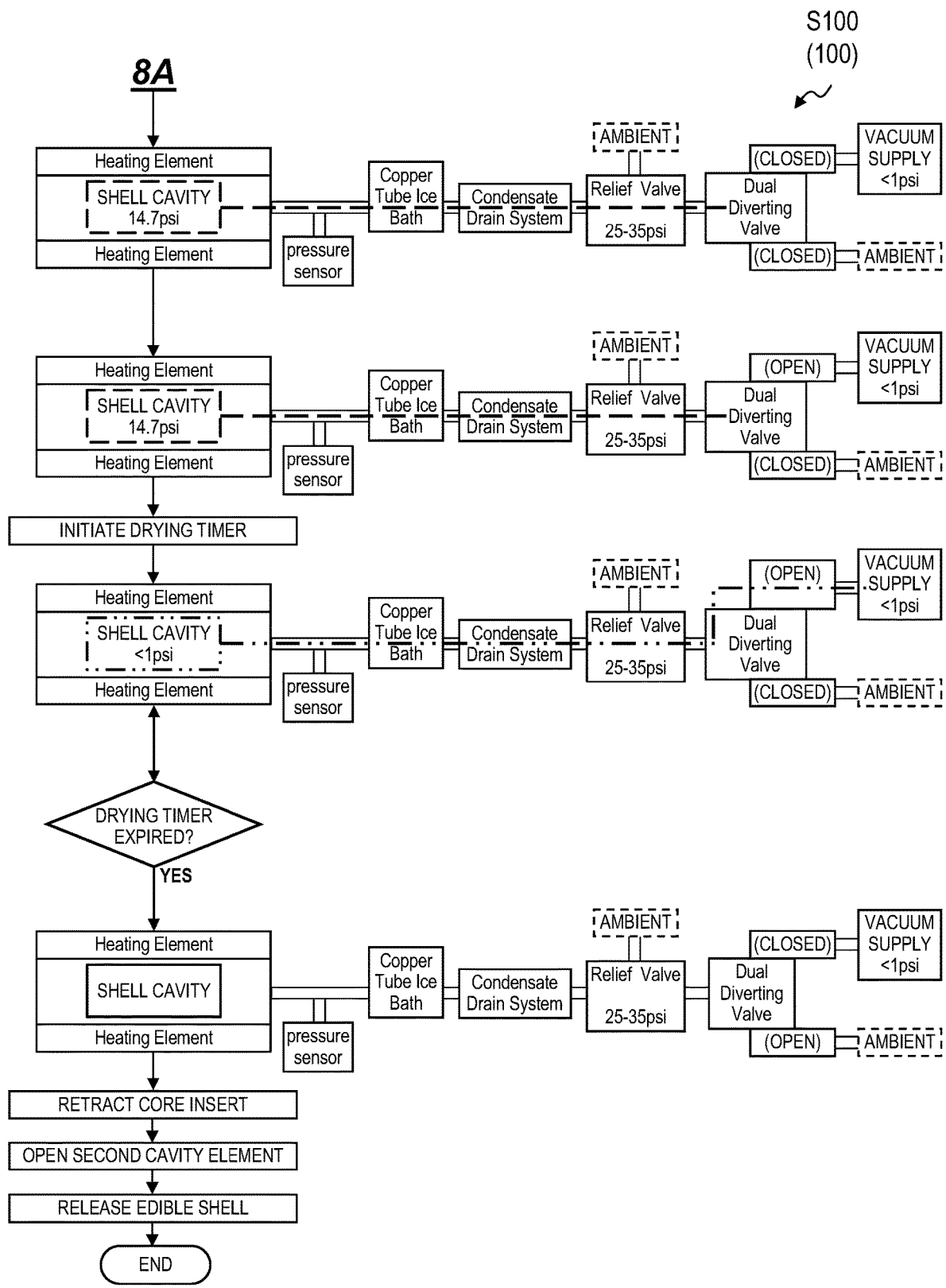

In one implementation shown in FIGS. 8A and 8B, the controller 180 can: trigger the set of actuators 170 to locate the second cavity element 120 in the closed position and the core insert 150 in the retracted position (i.e., the staging configuration) at a first time to receive a volume of batter; and then receive a command to initiate a cook cycle at a second time following placement of the volume of batter into the cook chamber 140. Then, in response to receipt of a command (e.g., from the operator or an external master controller 180), the controller 180 can: trigger the set of actuators 170 to locate the core insert 150 in the inserted position (i.e., the cook configuration); and initiate a cook timer for a target cook duration (e.g., 90 seconds for the soft-type batter; 120 seconds for the brittle-type batter). Prior to expiration of the cook timer, the relief valve 190 can also automatically open in response to the pressure within the cook chamber 140 exceeding the set pressure of the relief valve 190. Then, in response to expiration of the cook timer, the controller 180 can trigger the valve actuator 192 to open the relief valve 190 in order to release pressure and exhaust moisture from the cook chamber 140; and initiate a drying timer for a target drying (or "steam release") duration (e.g., 15 seconds for the soft-type batter; 30 seconds for the brittle-type batter). Then, in response to expiration of the drying timer, the controller 180 can: trigger the set of actuators 170 to locate the second cavity element 120 in the open position and the core insert 150 in the retracted position (i.e., the release configuration) to enable the operator to remove the edible shell from the system 100.

In this implementation, the controller 180 can also: supply power to the set of heating elements 160 to heat the first cavity element 110, the second cavity element 120, and/or the core insert 150 (e.g., to a target cook temperature) in order to cook starches (and other components) in the volume of batter while the cook timer is active; and similarly supply power to the set of heating elements 160 to heat the first cavity element 110, the second cavity element 120, and/or the core insert 150 (e.g., to the target cook temperature or other target drying temperature) in order to drive moisture out of the cook chamber 140 and thus dry the edible shell to a target moisture content while the drying timer is active (i.e., not yet expired). For example, the soft-type batter can be 63% (or between 55% and 70%) water by volume, and the system 100 can implement the foregoing process to dry a soft inner shell to 35% (or between 30% and 40%) water by volume upon completion of a cook cycle. Similarly, the brittle-type batter can be 64% (or between 55% and 70%) water by volume, and the system 100 can implement the foregoing process to dry a brittle outer shell to 2% (or between 1% and 5%) water by volume upon completion of a cook cycle.

Alternatively, the system 100 can include a pressure valve (such as arranged on the core base 152) that is solely actuated by the valve actuator 192, and the controller 180 can implement similar methods and techniques to selectively open and close the valve via the valve actuator 192 based on triggers (e.g., time-based, heat-flux, and/or pressure-based triggers) throughout a cook cycle.

14.3 Vacuum

In this variation, the system 100 can further include a vacuum supply 194 (e.g., a vacuum pump) coupled to the cook chamber 140 and configured to draw gases out of the cook chamber 140 to reduce the cavity pressure within the cook chamber 140 to below ambient, thereby reducing the boiling point temperature of water in cook chamber 140 and increasing a release rate of moisture from an edible shell forming in the cook chamber 140. (Alternatively, the system 100 can connect to an external vacuum supply 194.)

In one implementation, the system 100 includes: a first pressure valve actuated by the valve actuator 192, configured to exhaust to ambient, and arranged on the core base 152; and a second vacuum valve arranged on the core base 152 and coupled to the vacuum supply 194. In another implementation, the system 100 includes a three-way valve arranged on the core base 152 and actuated by the valve actuator 192 to: close the valve; open the valve to ambient; and couple the cook chamber 140 to the vacuum supply 194.

In one example shown in FIGS. 8A and 8B, during a cook cycle, the controller 180 can: trigger the set of actuators 170 to locate the second cavity element 120 in the closed position and the core insert 150 in the retracted position (i.e., the staging configuration) at a first time to receive a volume of batter; and then receive a command to initiate a cook cycle at a second time following placement of the volume of batter into the cook chamber 140. Then, in response to receipt of a command (e.g., from the operator or an external master controller 180), the controller 180 can: trigger the set of actuators 170 to locate the core insert 150 in the inserted position (i.e., the cook configuration); trigger the valve actuator 192 to close the valve; and initiate a cook timer for a target cook duration (e.g., 90 seconds for the soft-type batter; 120 seconds for the brittle-type batter). Then, in response to expiration of the cook timer, the controller 180 can: trigger the valve to open to a first position to exhaust moisture from the cook chamber 140 to ambient during a first time period (e.g., a preset duration of 8 seconds to enable pressure within the cook chamber 140 to equilibrate to ambient pressure); and then initiate a drying timer for a target drying duration. Then, during a second time period while the drying timer is active, the controller 180 can: trigger the valve to open to a second position to fluidly couple the cook chamber 140 to the vacuum supply 194; and then activate the vacuum supply 194 to reduce the cavity pressure within the cook chamber 140 to below ambient air pressure, draw moisture out of the cook chamber 140, and thus accelerate drying of the edible shell. Then, in response to expiration of the drying timer, the controller 180 can: deactivate the vacuum supply 194; trigger the valve actuator 192 to close the valve; and trigger the set of actuators 170 to locate the second cavity element 120 in the open position and the core insert 150 in the retracted position (i.e., the release configuration) to enable the operator to remove the edible shell from the system 100.

In this variation, the system 100 can further include a condensate drain 195: arranged between the valve and the vacuum supply 194; and configured to separate moisture and other particulate from gases flowing out of the valve—in the second position—toward the vacuum supply 194, thereby shielding the vacuum supply 194 from food waste.

14.4 Gas Injection

Additionally or alternatively, in this variation, the system 100 can include a gas port 196 coupled to the cook chamber 140; and a gas supply 197 configured to pressurize the cook chamber 140 with a gas (e.g., an inert gas, such as nitrogen)—via the gas port 196—during a cook cycle in order to entrap the gas in an edible shell. (Alternatively, the system 100 can connect to an external gas supply 197.)

In one implementation, the system 100 includes: a first pressure valve actuated by the valve actuator 192, configured to exhaust to ambient, and arranged on the core base 152; and a second gas valve arranged on the core base 152 and coupled to the gas supply 197. In another implementation, the system 100 includes a three-way valve arranged on the core base 152 and actuated by the valve actuator 192 to: close the valve; open the valve to ambient; and couple the cook chamber 140 to the gas supply 197.

For example, during a cook cycle, the controller 180 can: trigger the set of actuators 170 to locate the second cavity element 120 in the closed position and the core insert 150 in the retracted position (i.e., the staging configuration) at a first time to receive a volume of batter; and then receive a command to initiate a cook cycle at a second time following placement of the volume of batter into the cook chamber 140. Then, in response to receipt of a command (e.g., from the operator or an external master controller 180), the controller 180 can: trigger the set of actuators 170 to locate the core insert 150 in the inserted position (i.e., the cook configuration); initiate a cook timer for a target cook duration (e.g., 90 seconds for the soft-type batter; 120 seconds for the brittle-type batter); trigger the valve actuator 192 to open the valve to a first position to couple the cook chamber 140 to the gas supply 197; and thus supply pressurized gas (e.g., nitrogen, steam) to the cook chamber 140 to elevate the cook chamber 140 to a target pressure (e.g., 30 psi). Then, in response to expiration of the cook timer, the controller 180 can: initiate a drying timer for a target drying duration; and trigger the valve to open to a second position to exhaust moisture and gases from the cook chamber 140 to ambient. Then, in response to expiration of the drying timer, the controller 180 can: trigger the valve actuator 192 to open the valve to the first position to recouple the cook chamber 140 to the gas supply 197; and thus supply pressurized gas (e.g., nitrogen) to the cook chamber 140 to replace air or moisture in the pores of the edible shell with the gas, thereby modifying the texture and/or shelf stability of the edible shell. Finally, the controller 180 can: trigger the valve actuator 192 to close the valve; and trigger the set of actuators 170 to locate the second cavity element 120 in the open position and the core insert 150 in the retracted position (i.e., the release configuration) to enable the operator to remove the edible shell from the system 100.

15. Coating Nozzle

Figure 7A:
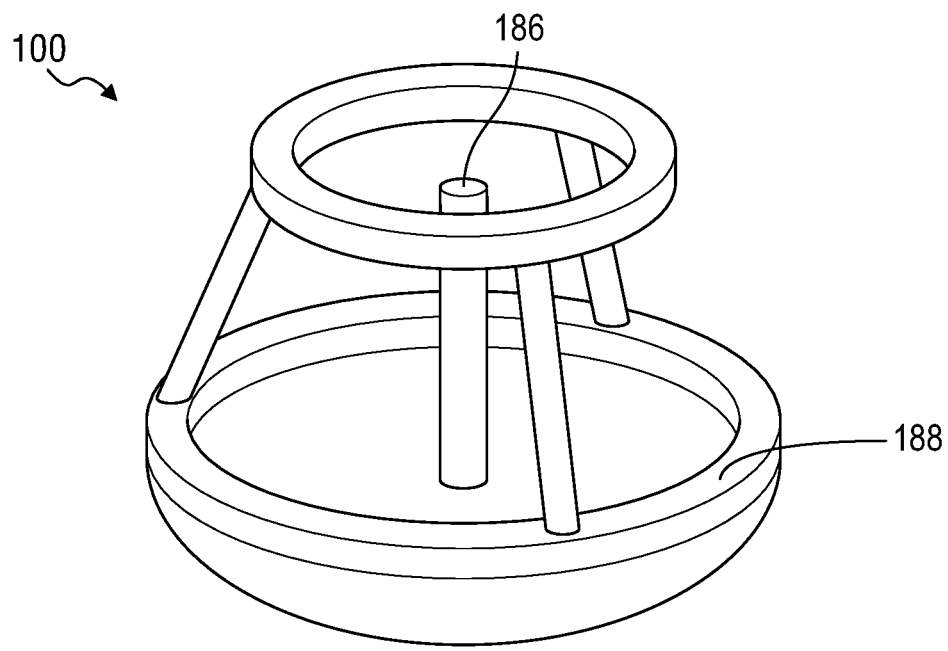
FIGS. 7A and 7B are schematic representations of variation of the system.
Figure 7B:
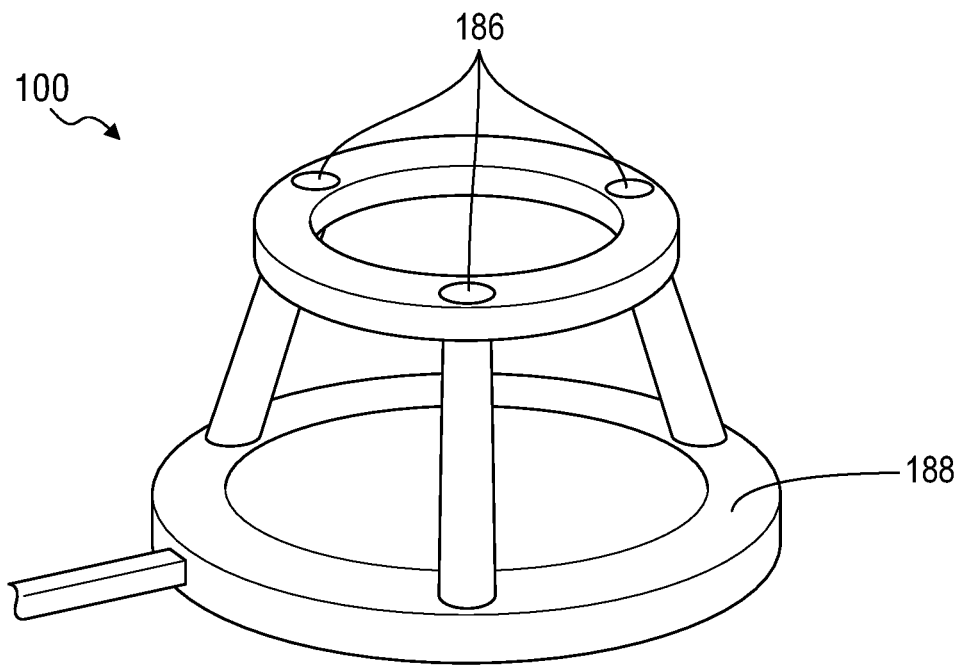

As shown in FIGS. 7A and 7B, in one variation, one instance of a system configured to cook a soft inner shell includes a nozzle 186 configured to dispense a binding promoter onto an exterior surface of the soft inner shell—following completion of the cook cycle and prior to insertion into the brittle outer shell—in order to promote adhesion between the soft inner shell and the brittle outer shell and to thus form a contiguous multilayer edible carrier.

In one implementation, a first nozzle 186: is coupled to (e.g., mounted to, arranged over) the first cavity element 110; is coupled to a water supply; and is configured to the binding promoter (e.g., water) onto the exterior surface of the soft inner shell—during removal of the soft inner shell from the cook chamber 140—to promote adhesion and conglomeration of the exterior surface of the soft inner shell with an interior surface of the brittle outer shell. The system 100 can similarly include a second nozzle 186 arranged on the second cavity element 120 and facing the first nozzle 186. Thus, as the operator extracts the soft inner shell from the first or second cavity element 120 following completion of the cook cycle, the operator may raise the edible shell in front of the first and second nozzles 186 and then manually trigger the nozzles 186 to spray water across the outer surface of the soft inner shell in preparation for insertion of the soft inner shell into the brittle outer shell to complete the multilayer edible shell.

In another implementation, the nozzle 186 is located in a preparation station 188 separate from the system 100. For example, the nozzle 186 can include a set of atomizing nozzles or misters circumscribing a target region within the preparation station 188; and the preparation station 188 can include a fixed or rotating shell stage configured to support soft inner shells within the target region. Upon retrieving a soft inner shell from a first instance of the system 100, an operator may locate this soft inner shell on the shell stage; the preparation station 188 can then activate the nozzle 186 (e.g., automatically or responsive to a manual input from the operator) to spray the binding promoter (e.g., water) onto the outer surface of the soft inner shell in Block S130.

For example, the soft inner shell may cook in less than 50% of the time required to cook the brittle outer shell. Therefore, an operator may: first initiate a second instance of the system 100 to cook a brittle outer shell; then initiate a first instance of the system 100 to cook a soft inner shell; retrieve the soft inner shell once cooked and while the brittle outer shell continues to cook in the second instance of the system 100; place the soft inner shell on the shell stage in the preparation station 188 for coating with the binding agent; leave the soft inner shell on the shell stage to enable excess binding agent to flow off of the soft inner shell; retrieve the brittle outer shell once cooked; and place the brittle outer shell over the soft inner shell—supported on the shell stage—to initiate adhesion therebetween. The operator may then retrieve the resulting multilayer edible carrier and load the multilayer edible carrier with fillings and toppings.

16. Multistage System

In one variation shown in FIG. 5, a multistage system includes multiple instances of the system 100 (i.e., multiple mold assemblies) and is configured to concurrently cook multiple layers of the multilayer edible carrier. For example, the multistage system can include: a first mold assembly configured to cook a first soft inner shell of the edible carrier; and a second mold assembly configured to cook a second brittle outer shell of the edible carrier. The controller 180 can coordinate cook cycles at the first and second mold assemblies such that a soft inner shell and a brittle outer shell are completed in short succession (e.g., within a few seconds of each other), thereby aiding an operator in assembling the edible carrier quickly and efficiently and reducing preparation time for the edible food carrier. Alternatively, the controller 180 can coordinate cook cycles at the first and second mold assemblies such that a soft inner shell is completed first with a target delay (e.g., 30 seconds) until completion of the brittle outer shell, thereby enabling the operator to apply the binding agent to the soft inner shell just before the brittle outer shell and aiding quick assembly of the edible carrier with minimal downtime of the multistage system.

In another implementation in which the soft inner and brittle outer shells require different cook times, the multistage system can include different quantities of the first and second mold assemblies in order to complete equal quantities of the soft inner and brittle outer shells over time. In one example, the soft inner shell is allocated a cook time of 45 seconds, and the brittle outer shell is allocated a cook time of 135 seconds. In this example, the multistage system can include three instances of the second mold assembly configured to cook the brittle outer shell and a single instance of the first mold assembly configured to cook the soft inner shell. Accordingly, the multistage system can complete one pair of soft inner and brittle outer shells per minute throughout operation (including batter reload times for each mold assembly).

17. Filling

Once the multilayer edible carrier is assembled, the operator may load various fillings and toppings into the internal volume formed by the multilayer edible carrier, such as salad fillings, taco fillings, meatball marinara fillings, or any other sweet and/or savory fillings, as shown in FIG. 6. With the multilayer edible carrier loaded with a filling, the soft inner shell of the edible carrier can function as a barrier between liquids in the filling and the brittle outer shell (e.g., by absorbing this liquid or preventing diffusion of this liquid toward the brittle outer shell), thereby: preventing absorption of these liquids by the brittle outer shell; preventing softening of the brittle outer layer; and maintaining the "crispy" or "crunchy" mouthfeel of the edible carrier over an extended duration of time (e.g., throughout the entire duration of a meal).

18. User Experience

The multilayer edible carrier may then be served to a customer, such as in the form of a meal or snack. The customer may first break the chip from the top edge of the multilayer edible carrier and consume this chip as an appetizer or dip this chip in the toppings in the multilayer edible carrier before consuming. The customer may then hold the structurally-stable multilayer edible carrier in one hand and bite into the multilayer edible carrier and its fillings. The brittle outer layer of the multilayer edible carrier may then break around the customer's bite and shatter in the user's mouth as she chews, thereby producing a crispy and satisfying initial mouthfeel. Concurrently, the soft inner shell may tear around the user's bite and produce a soft, pillowy (or "chewy") mouthfeel behind the crispy mouthfeel of the brittle outer shell. The user may then taste the fillings, all of which result in a dynamic textual experience overlayed on flavors of the brittle outer shell (e.g., salty), the soft inner shell (e.g., sweet), and the fillings (e.g., primary meal flavors).

Furthermore, as the customer continues to consume the multilayer edible carrier and its fillings, the soft inner shell continues to prevent diffusion of liquid from the fillings toward the brittle outer shell such that the multilayer edible carrier maintains both its structure and its mouthfeel (or "crispyness") throughout the duration of the meal.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for cooking an edible carrier comprising:
   a first cavity element defining a first internal cook surface and a first core mating surface;
   a second cavity element:
      operable in a closed position and an open position;
      defining a second internal cook surface cooperating with the first internal cook surface of the first cavity element to form a cook chamber in the closed position;
      defining a second core mating surface cooperating with the first core mating surface of the first cavity element to define a cavity interface in the closed position; and
      retracted from the first cavity element in the open position;
   a core insert:
      operable in an inserted position and a retracted position;
      comprising a core base sealed against the cavity interface in the inserted position;
      comprising a cook surface projection extending from the core base, the cook surface projection located within the cook chamber and inset from the first internal cook surface and the second internal cook surface in the inserted position to form a shell cavity; and
      retracted from the first cavity element and the second cavity element in the retracted position;
   a set of heating elements configured to heat the first cavity element and the second cavity element during a cook cycle to cook a volume of batter within the shell cavity into an edible shell; and
   a set of actuators configured to:

transition the second cavity element between the closed position and the open position; and
transition the core insert between the inserted position and the retracted position.

2. The system of claim 1:
wherein the core base is configured to seal against the cavity interface to hold a cavity pressure within the cook chamber above ambient air pressure during the cook cycle; and
further comprising a relief valve:
coupled to the core base; and
configured to open to exhaust gases from the cook chamber in response to the cavity pressure exceeding a set pressure, greater than ambient air pressure, during the cook cycle.

3. The system of claim 2, further comprising:
a valve actuator coupled to the relief valve; and
a controller configured to:
trigger the set of actuators to locate the second cavity element in the closed position and the core insert in the retracted position at a first time;
receive a command to initiate the cook cycle at a second time succeeding the first time following placement of the volume of batter into the cook chamber;
in response to receipt of the command:
trigger the set of actuators to locate the core insert in the inserted position; and
initiate a cook timer for a cook duration;
in response to expiration of the cook timer:
trigger the valve actuator to open the relief valve to exhaust moisture from the cook chamber; and
initiate a drying timer for a drying duration; and
in response to expiration of the drying timer, trigger the set of actuators to locate the second cavity element in the open position and the core insert in the retracted position.

4. The system of claim 3, wherein the controller is further configured to:
supply power to the set of heating elements to heat the first cavity element and the second cavity element to cook starches in the volume of batter while the cook timer is active; and
supply power to the set of heating elements to heat the first cavity element and the second cavity element to drive moisture out of the cook chamber and dry the edible shell while the drying timer is active.

5. The system of claim 4:
wherein the pressure relief valve is configured to open to exhaust moisture from the cook chamber in response to the cavity pressure exceeding the set pressure greater than 25 pounds per square inch; and
wherein the controller is configured to control the valve actuator and the set of heating elements during the cook cycle to reduce moisture content of the volume of batter from greater than 55% water by volume to less than 5% water by volume.

6. The system of claim 1, further comprising:
a valve fluidly coupled to the cook chamber; and
a controller configured to:
trigger the valve to close;
trigger the set of actuators to locate the second cavity element in the closed position and the core insert in the retracted position at a first time;
receive a command to initiate the cook cycle at a second time succeeding the first time following placement of the volume of batter into the cook chamber;
in response to receipt of the command:
trigger the set of actuators to locate the core insert in the inserted position; and
initiate a cook timer for a cook duration;
in response to expiration of the cook timer:
trigger the valve to open the relief valve to exhaust moisture from the cook chamber; and
initiate a drying timer for a drying duration; and
in response to expiration of the drying timer, trigger the set of actuators to locate the second cavity element in the open position and the core insert in the retracted position.

7. The system of claim 6:
further comprising a vacuum supply coupled to the valve; and
wherein the controller is configured to:
in response to expiration of the cook timer, trigger the valve to open to a first position to exhaust moisture from the cook chamber to ambient during a first time period; and
during a second time period while the drying timer is active, trigger the valve to open to a second position to fluidly couple the cook chamber to the vacuum supply to reduce a cavity pressure within the cook chamber below ambient air pressure, draw moisture out of the cook chamber, and dry the edible shell.

8. The system of claim 7:
wherein the valve is arranged on the core base; and
further comprising a condensate drain arranged between the valve and the vacuum supply.

9. The system of claim 1:
wherein, in the closed position, the second core mating surface of the second core insert cooperates with the first core mating surface to define the cavity interface comprising a rim encircling a secondary cook chamber contiguous with the cook chamber;
wherein, in the inserted position, the core base of the core insert seals against the rim and encloses the secondary cook chamber;
wherein, during transition into the inserted position, the cook surface projection of the core insert displaces the volume of batter through the shell cavity and across the secondary cook chamber; and
wherein the set of heating elements heat the first cavity element and the second cavity element during the cook cycle to cook the volume of batter into the edible shell comprising:
a thin-wall vessel defining an external vessel geometry according to the cook chamber; and
an edible chip extending laterally from a top of the thin-wall vessel and defining a chip geometry according to the secondary cook chamber.

10. The system of claim 9:
wherein, in the closed position, the second internal cook surface of the second cavity element cooperates with the first internal cook surface of the first cavity element to form the cook chamber defining a longitudinal axis; and
wherein the secondary cook chamber extends outwardly from a top of the cook chamber perpendicular to the longitudinal axis.

11. The system of claim 1:

wherein, in the inserted position, the cook surface projection of the core insert cooperates with the cook chamber to form the shell cavity defining a first thin-shell volume of a first geometry;
wherein the set of heating elements are configured to heat the first cavity element and the second cavity element during the cook cycle to cook the volume of batter into the edible shell comprising a brittle vessel in the first geometry; and
further comprising:
a third cavity element defining a third internal cook surface and a third core mating surface;
a fourth cavity element:
operable in the closed position and the open position;
defining a fourth internal cook surface cooperating with the third internal cook surface of the third cavity element to form a second cook chamber in the closed position;
defining a fourth core mating surface cooperating with the third core mating surface of the third cavity element to define a second cavity interface in the closed position; and
retracted from the third cavity element in the open position;
a second core insert:
operable in the inserted position and the retracted position;
comprising a second core base sealed against the second cavity interface in the inserted position;
comprising a second cook surface projection extending from the second core base, the second cook surface projection located within the second cook chamber and inset from the third internal cook surface and the fourth internal cook surface in the inserted position to form a second shell cavity defining a second thin-shell volume of a second geometry insert from the first geometry; and
retracted from the third cavity element and the fourth cavity element in the retracted position;
a second set of heating elements configured to heat the third cavity element and the fourth cavity element during a second cook cycle to cook a second volume of batter within the second shell cavity into a soft vessel in the second geometry and configured for insertion into the brittle vessel;
a second set of actuators configured to:
transition the fourth cavity element between the closed position and the open position; and
transition the second core insert between the inserted position and the retracted position.

12. The system of claim 11, further comprising:
a foamed batter injection subsystem:
coupled to the first cavity element; and
configured to dispense the volume of batter comprising a foamed batter into the cook chamber; and
a fluid batter injection subsystem:
coupled to the third cavity element; and
configured to dispense the second volume of batter comprising a fluid batter into the second cook chamber.

13. The system of claim 11:
wherein, in the inserted position, the cook surface projection of the core insert cooperates with the cook chamber to form the shell cavity defining a first thin-shell volume of a first geometry;
wherein the set of heating elements are configured to heat the first cavity element and the second cavity element during the cook cycle to cook the volume of batter into the edible shell comprising a soft vessel in the first geometry; and
further comprising a nozzle configured to dispense a binding promoter onto an exterior surface of the edible shell for insertion into and adhesion to a second edible shell to form a multilayer edible carrier, the second edible shell comprising a rigid vessel approximating the first geometry.

14. The system of claim 13, wherein the nozzle is:
coupled to the first cavity element; and
configured to spray water onto the exterior surface of the edible shell, during removal of the edible shell from the cook chamber, to promote conglomeration of the exterior surface of the edible shell with an interior surface of the second edible shell.

15. The system of claim 1, wherein the first internal cook surface of the first cavity element defines:
a positive draft geometry; and
an undercut feature configured to retain the edible shell within the first cavity element during retraction of the cook surface projection out of the cook chamber following completion of the cook cycle.

16. The system of claim 1:
wherein, in the closed position, the second internal cook surface of the second cavity element cooperates with the first internal cook surface of the first cavity element to form the cook chamber defining a longitudinal axis; and
further comprising:
a first linkage coupled to the set of actuators and configured to transition the core insert from the inserted position into the retracted position by sweeping the core insert along:
a first path segment, proximal the cook chamber, approximating a first linear path along the longitudinal axis; and
a second path segment, remote from the cook chamber, approximating an arc that locates the core insert behind the first cavity element to expose the first internal cook surface; and
a second linkage coupled to the set of actuators and configured to transition the second cavity element from the closed position into the open position by sweeping the second cavity element along:
a third path segment, proximal the first cavity element, approximating a second linear path perpendicular to the longitudinal axis; and
a fourth path segment, remote from the first cavity element, approximating an arc that locates the second cavity element below the first cavity element to expose the first internal cook surface.

17. The system of claim 1, further comprising:
a gas port coupled to the cook chamber; and
a gas supply configured to pressurize the cook chamber with an inert gas, via the gas port, during the cook cycle to entrap the inert gas in the edible shell.

18. A system for cooking an edible carrier comprising:
a first mold assembly comprising:
a first rear cavity element, a first front cavity element, and a first core insert:
assembled to form a first thin-shell cavity, of a first geometry, in a first cook configuration;
separated in a first release configuration;
a first set of heating elements configured to heat the first thin-shell cook chamber; and a first set of actuators configured to transition the first rear cavity element, the first front cavity element, and the first core insert between the first cook configuration and the first release configuration;

a second mold assembly comprising:
  a second rear cavity element, a second front cavity element, and a second core insert:
    assembled to form a second thin-shell cavity, approximating the first geometry, in a second cook configuration; and
    separated in a second release configuration;
  a second set of heating elements configured to heat the second thin-shell cook chamber; and
  a second set of actuators configured to transition the second rear cavity element, the second front cavity element, and the second core insert between the second cook configuration and the second release configuration; and a controller configured to:
  control the first set of heating elements and the first set of actuators to cook a first batter into a brittle edible shell of the first geometry; and
  control the second set of heating elements and the second set of actuators to cook a second batter into a soft edible shell, approximating the first geometry, for insertion into the brittle edible shell to form a multilayer edible carrier.

19. The system of claim 18:
wherein the first rear cavity element defines a first internal cook surface and a first core mating surface;

wherein the first front cavity element:
  defines a second internal cook surface cooperating with the first internal cook surface of the first rear cavity element to form a cook chamber in the first cook configuration;
  defines a second core mating surface cooperating with the first core mating surface of the first rear cavity element to define a cavity interface in the first cook configuration; and
  is retracted from the first rear cavity element in the first release configuration;

wherein the first core insert:
  comprises a core base sealed against the cavity interface in the first cook configuration;
  comprises a cook surface projection extending from the core base, the cook surface projection located within the cook chamber and inset from the first internal cook surface and the second internal cook surface in the first cook configuration to form the first thin-shell cavity; and
  is retracted from the first rear cavity element and the first front cavity element in the first release configuration; and wherein the set of heating elements is configured to heat the first rear cavity element and the first front cavity element during a first cook cycle to cook the first batter within the first thin-shell cavity into the brittle edible shell.

* * * * *